(12) United States Patent
Lupescu et al.

(10) Patent No.: US 8,635,852 B2
(45) Date of Patent: Jan. 28, 2014

(54) EXHAUST TREATMENT SYSTEM FOR INTERNAL COMBUSTION ENGINE

(75) Inventors: Jason Aaron Lupescu, Ypsilanti, MI (US); James Michael Kerns, Trenton, MI (US); Michael James Uhrich, West Bloomfield, MI (US); Ken O. Jahr, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 12/579,618

(22) Filed: Oct. 15, 2009

(65) Prior Publication Data

US 2011/0072801 A1 Mar. 31, 2011

Related U.S. Application Data

(60) Provisional application No. 61/246,940, filed on Sep. 29, 2009.

(51) Int. Cl.
- F02M 25/06 (2006.01)
- F01N 3/00 (2006.01)
- F01N 3/02 (2006.01)

(52) U.S. Cl.
USPC .......... 60/278; 60/274; 60/287; 60/295; 60/297; 60/311

(58) Field of Classification Search
USPC .......... 60/274, 278, 287, 295, 297, 311
See application file for complete search history.

(56) References Cited

U.S. PATENT DOCUMENTS

| | | | |
|---|---|---|---|
| 5,184,462 A * | 2/1993 | Schatz | 60/274 |
| 5,307,627 A * | 5/1994 | Christensen et al. | 60/274 |
| 5,946,906 A * | 9/1999 | Akazaki et al. | 60/278 |
| 5,950,420 A * | 9/1999 | Geiger | 60/311 |
| 6,138,649 A * | 10/2000 | Khair et al. | 123/568.12 |
| 6,742,335 B2 * | 6/2004 | Beck et al. | 60/278 |
| 6,899,090 B2 * | 5/2005 | Arnold | 123/568.12 |
| 7,013,879 B2 * | 3/2006 | Brookshire et al. | 123/568.12 |
| 7,043,914 B2 * | 5/2006 | Ishikawa | 60/605.2 |
| 7,080,506 B2 * | 7/2006 | Fukuzumi et al. | 60/278 |
| 7,284,366 B2 * | 10/2007 | Kurtz | 60/277 |
| 7,299,626 B2 | 11/2007 | Barasa et al. | |
| 7,334,397 B2 * | 2/2008 | Blomquist | 60/278 |
| 8,136,349 B2 * | 3/2012 | Gieshoff et al. | 60/297 |
| 2009/0120071 A1 | 5/2009 | Gandhi et al. | |

OTHER PUBLICATIONS

Hepburn, Jeffrey S. et al., "System and Method for Regenerating a Particulate Filter Accompanied by a Catalyst," U.S. Appl. No. 12/638,511, filed Dec. 15, 2009, 53 pages.

(Continued)

*Primary Examiner* — Thomas Denion
*Assistant Examiner* — Diem Tran
(74) *Attorney, Agent, or Firm* — Julia Voutyras; Alleman Hall McCoy Russell & Tuttle LLP

(57) ABSTRACT

Methods and systems are provided for operating an engine including an exhaust treatment system coupled to an engine exhaust, the exhaust treatment system further coupled to an engine intake via an exhaust gas recirculation (EGR) system. One example method comprises, operating in a first mode including routing exhaust gas through the exhaust treatment system to an exhaust tailpipe; operating in a second mode including routing exhaust gas through the exhaust treatment system to an engine intake via the EGR system, and operating in a third mode including routing exhaust gas to an engine intake through the EGR system while bypassing the exhaust treatment system.

19 Claims, 10 Drawing Sheets

(56) References Cited

OTHER PUBLICATIONS

Hepburn, Jeffrey S. et al., "System and Method for Regenerating a Particulate Filer," U.S. Appl. No. 12/638,533, filed Dec. 15, 2009, 55 pages.
Ruhland, Helmut H. et al., "Method for Controlling Spark for Particulate Filter Regenerating," U.S. Appl. No. 12/638,555, filed Dec. 15, 2009, 52 pages.
Hubbard, Carolyn P. et al., "Fuel Control for Spark Ignited Engine Having a Particulate Filter System," U.S. Appl. No. 12/638,595, filed Dec. 15, 2009, 52 pages.
Hubbard, Carolyn P. et al., "Method for Controlling Fuel of a Spark Ignited Engine While Regenerating a Particulate Filter," U.S. Appl. No. 12/638,633, filed Dec. 15, 2009, 53 pages.
Ruona, William C. et al., "Gasoline Particulate Filter Regeneration and Diagnostics," U.S. Appl. No. 12/689,930, filed Jan. 19, 2010, 60 pages.
Bidner, David K. et al., "Particulate Filter Regeneration During Engine Shutdown," U.S. Appl. No. 12/629,743, filed Dec. 2, 2009, 41 pages.
Bidner, David K. et al., "Particulate Filter Regeneration During Engine Shutdown," U.S. Appl. No. 12/610,991, filed Nov. 2, 2009, 65 pages.
Bidner, David K. et al., "Particulate Filter Regeneration in an Engine," U.S. Appl. No. 12/611,002, filed Nov. 2, 2009, 64 pages.
Bidner, David K. et al., "Particulate Filter Regeneration in an Engine," U.S. Appl. No. 12/611,009, filed Nov. 2, 2009, 65 pages.
Bidner, David K. et al., "Particulate Filter Regeneration in an Engine Coupled to an Energy Conversion Device," U.S. Appl. No. 12/611,019, filed Nov. 2, 2009, 64 pages.
Bidner, David K. et al., "Particulate Filter Regeneration in an Engine," U.S. Appl. No. 12/611,027, filed Nov. 2, 2009, 52 pages.
Van Nieuwstadt, Michiel J., "Control of Exhaust Flow in an Engine Including a Particulate Filter," U.S. Appl. No. 12/648,833, filed Dec. 29, 2009, 38 pages.
Van Nieuwstadt, Michiel J., "Controlling Operation of Exhaust of an Engine Including a Particulate Filter," U.S. Appl. No. 12/648,839, filed Dec. 29, 2009, 38 pages.
Van Nieuwstadt, Michiel J. et al., "System and Method for Regenerating a Particulate Filter for a Direct Injection Engine," U.S. Appl. No. 12/620,354, filed Nov. 17, 2009, 47 pages.
Van Nieuwstadt, Michiel J. et al., "Method for Adjusting Boost Pressure While Regenerating a Particulate Filter for a Direct Injection Engine," U.S. Appl. No. 12/620,366, filed Nov. 17, 2009, 46 pages.
Van Nieuwstadt, Michiel J. et al., "System for Regenerating a Particulate Filter and Controlling EGR," U.S. Appl. No. 12/620,374, filed Nov. 17, 2009, 46 pages.
Kerns, James M. et al., "Method for Regenerating a Particulate Filter for a Boosted Direct Injection Engine," U.S. Appl. No. 12/620,386, filed Nov. 17, 2009, 46 pages.
Zawacki, Garry A. et al., "System for an Engine Having a Particulate Matter Sensor," U.S. Appl. No. 12/643,563, filed Dec. 21, 2009, 40 pages.
Zawacki, Garry A. et al., "Method for Evaluating Degradation of a Particulate Matter Sensor," U.S. Appl. No. 12/643,568, filed Dec. 21, 2009, 38 pages.
Zawacki, Garry A. et al., "Method for Evaluating Degradation of a Particulate Matter Sensor After an Engine Start," U.S. Appl. No. 12/643,575, filed Dec. 21, 2009, 38 pages.

* cited by examiner

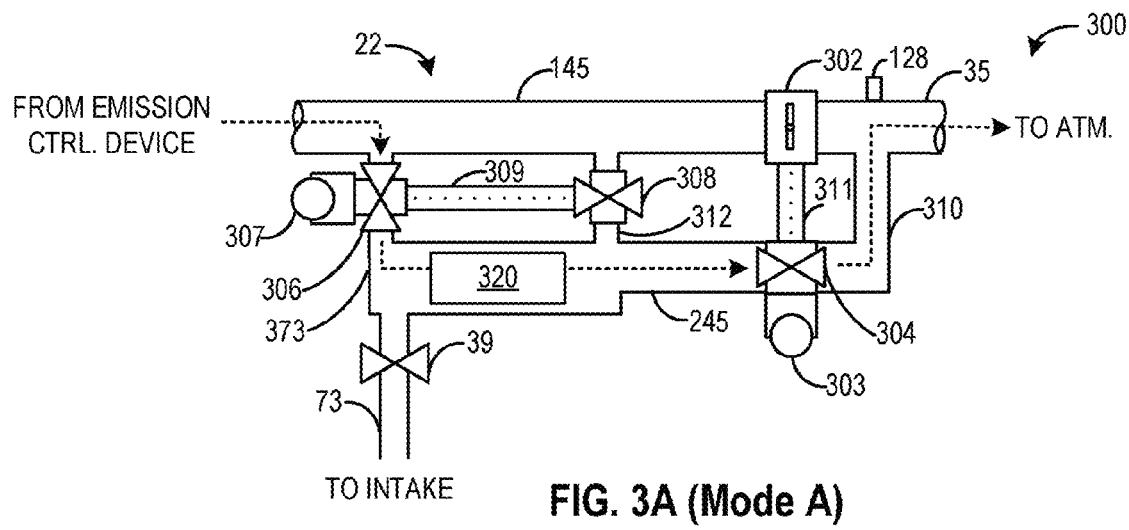
FIG. 3A (Mode A)
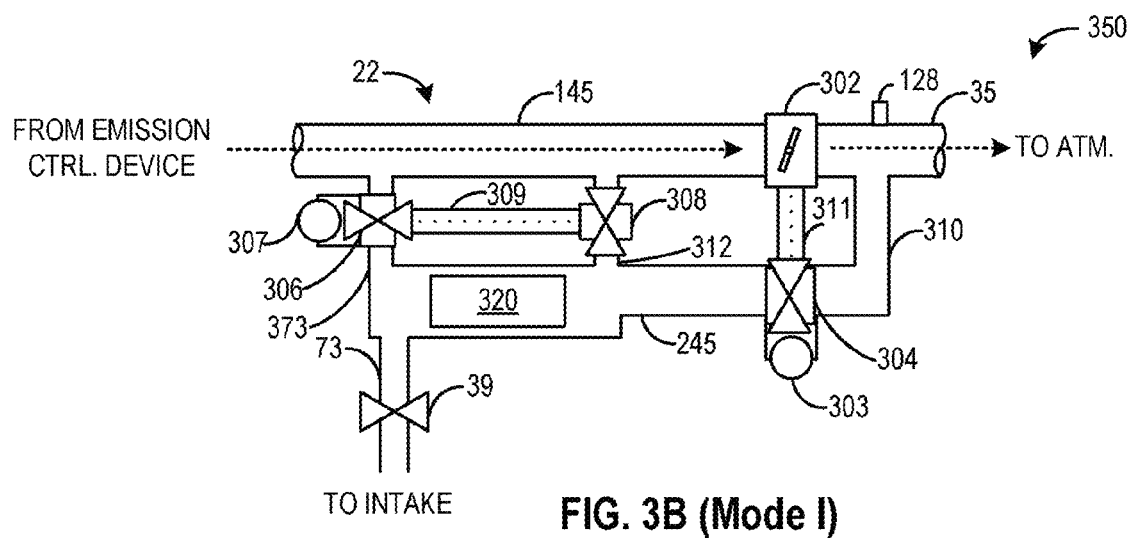
FIG. 3B (Mode I)
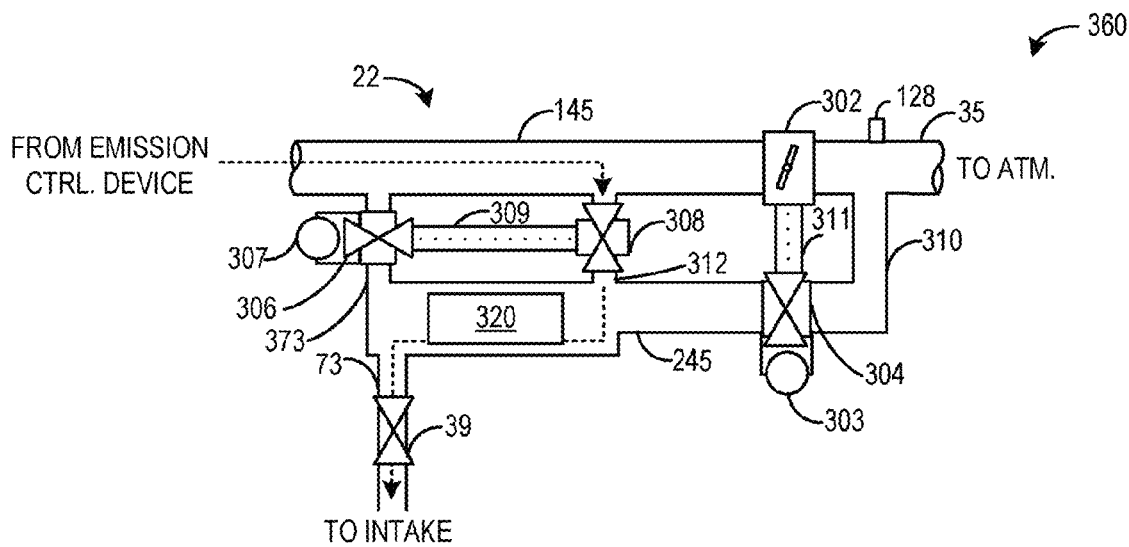
FIG. 3C (Mode B)

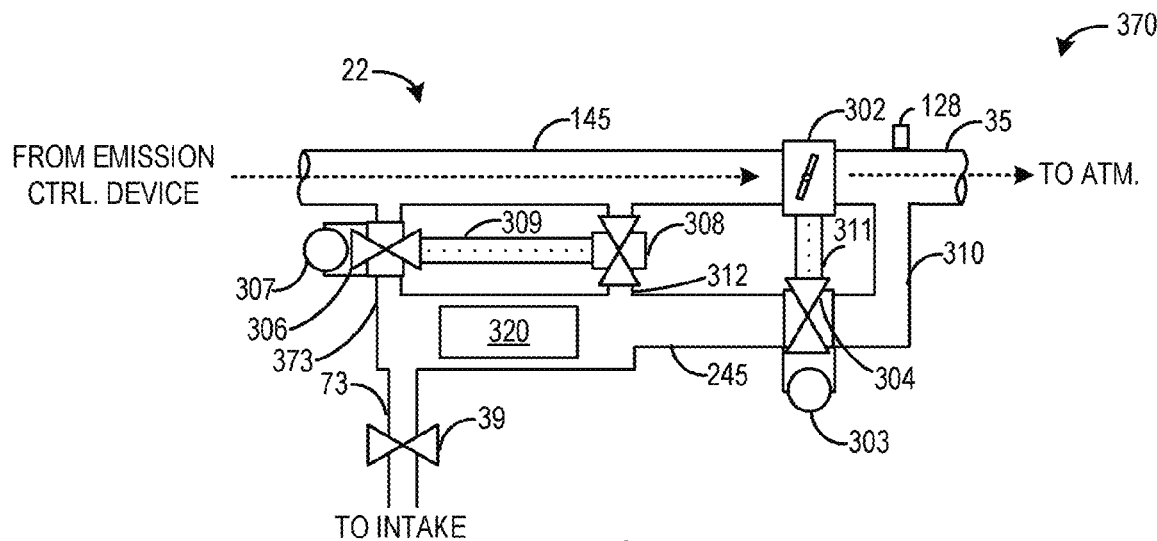
FIG. 3D (Mode II)
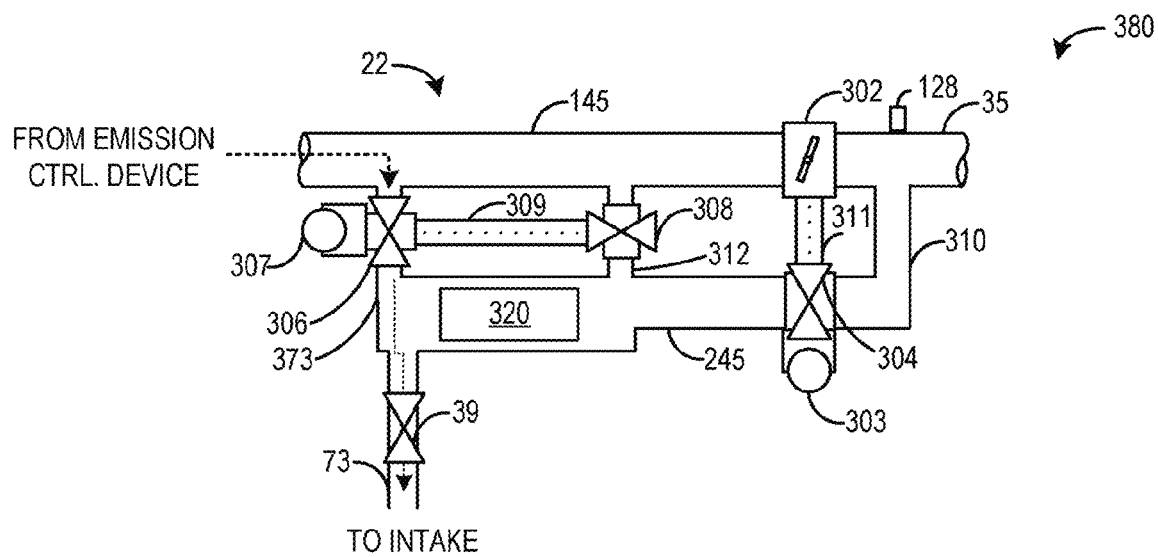
FIG. 3E (Mode C)

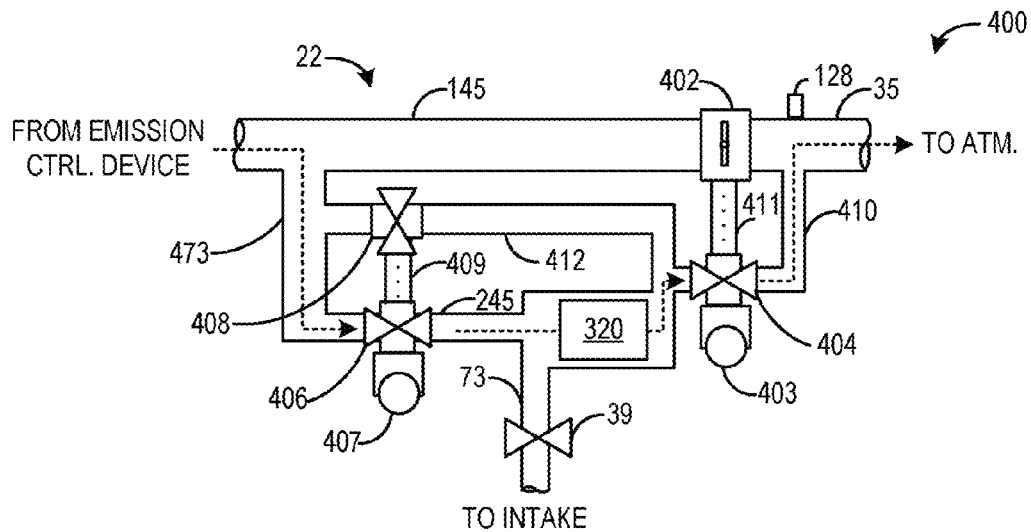
FIG. 4A (Mode A)
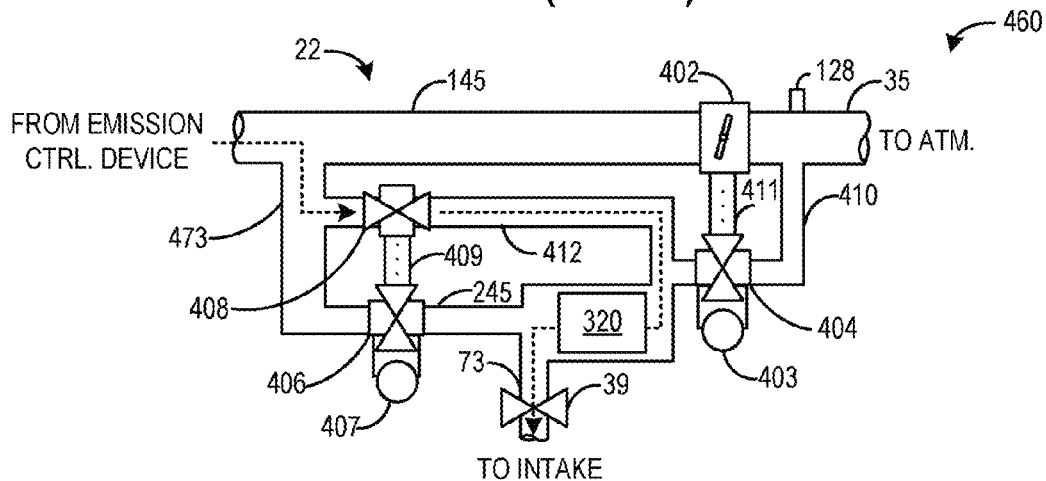
FIG. 4B (Mode B)
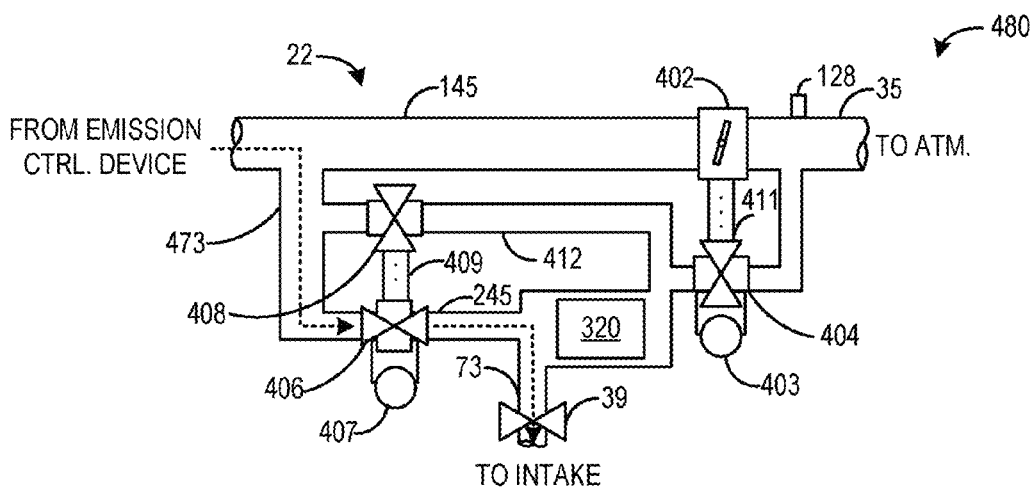
FIG. 4C (Mode C)

Stored HC removal efficiency

| Inlet Gas Temperature | Average On-Cycle Flow Through CHCT | | |
|---|---|---|---|
| | 0 L/min | 34 L/min | 53 L/min |
| 200°C-250°C | 0% | 43% | 80% |
| 300°C-350°C | 23% | 57% | 95% |

FIG. 11

| Mode | Throttle | Iso. valve | Diverter | Purge valve | EGR valve |
|---|---|---|---|---|---|
| A: HC & PM storage | Closed | Open | Open | Closed | Closed |
| I: Intermediate cold | Open | Closed | Closed | Open | Closed |
| B: Purge | Open | Closed | Closed | Open | Open |
| II: Intermediate idle | Open | Closed | Closed | Open | Closed |
| C: EGR | Open | Closed | Open | Closed | Open |

FIG. 8

EXHAUST TREATMENT SYSTEM FOR INTERNAL COMBUSTION ENGINE

CROSS REFERENCE TO RELATED APPLICATION

The present application claims priority to U.S. Provisional Patent Application No. 61/246,940, filed Sep. 29, 2009, titled "Exhaust Treatment System for Internal Combustion Engine," the entire contents of each of which are incorporated herein by reference.

FIELD

The present description relates generally to an exhaust treatment system for a combustion engine configured to trap hydrocarbon and particulate matter emissions.

BACKGROUND/SUMMARY

Engine exhaust systems utilize hydrocarbon retaining devices, such as hydrocarbon (HC) traps, to retain cold start emissions (HC storing) for later reaction, or to recirculate (HC purging) into the engine intake system. However, in engines such as gasoline-based direct-injection engines, when operating at high loads, a substantial amount of fine particulate matter (such as soot) may also be generated. The particulate matter (PM) may not be effectively removed by such hydrocarbon traps. When released into the atmosphere, these fine particles can pose serious environmental and health risks.

Some of the above issues may be addressed by a method of operating an engine including an exhaust treatment system coupled to an engine exhaust, the exhaust treatment system further coupled to an engine intake via an exhaust gas recirculation (EGR) system. In one embodiment, the method comprises, operating in a first mode including routing exhaust gas through the exhaust treatment system to an exhaust tailpipe; operating in a second mode including routing exhaust gas through the exhaust treatment system to an engine intake via the EGR system, and operating in a third mode including routing exhaust gas to an engine intake through the EGR system while bypassing the exhaust treatment system.

In one example, during an engine cold start condition, exhaust gas may be routed through the exhaust treatment system to an exhaust tailpipe to store exhaust hydrocarbons (HCs) and particulate matter (PM) in the exhaust treatment system. In another example, during a purging condition, exhaust gas may be routed through the exhaust treatment system to an engine intake via an EGR system, such as a low pressure EGR system, to purge the stored HCs and PMs to the engine intake. In yet another example, during an EGR condition, exhaust gas may be routed to the engine intake through the EGR system while bypassing the exhaust treatment system to only recirculate exhaust gas to the engine intake. In this way, an exhaust treatment system may be used to store exhaust HCs and PMs until a catalyst light-off temperature is reached, following which the purge flow of stored HCs and PMs may also be used an EGR flow. Further, when desired, an EGR operation independent of the exhaust treatment system may also be performed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3A-E and 4A-C shows example embodiments of the exhaust treatment system of FIG. 1 in various modes of operation.

FIG. 8 shows a table summarizing the position of the various valves of the exhaust treatment system of FIG. 1 in the various operating modes.

FIG. 11 shows a table summarizing the stored hydrocarbon removal efficiency of an example hydrocarbon and particulate matter trap assembly of the present disclosure.

DETAILED DESCRIPTION

Figure 1:
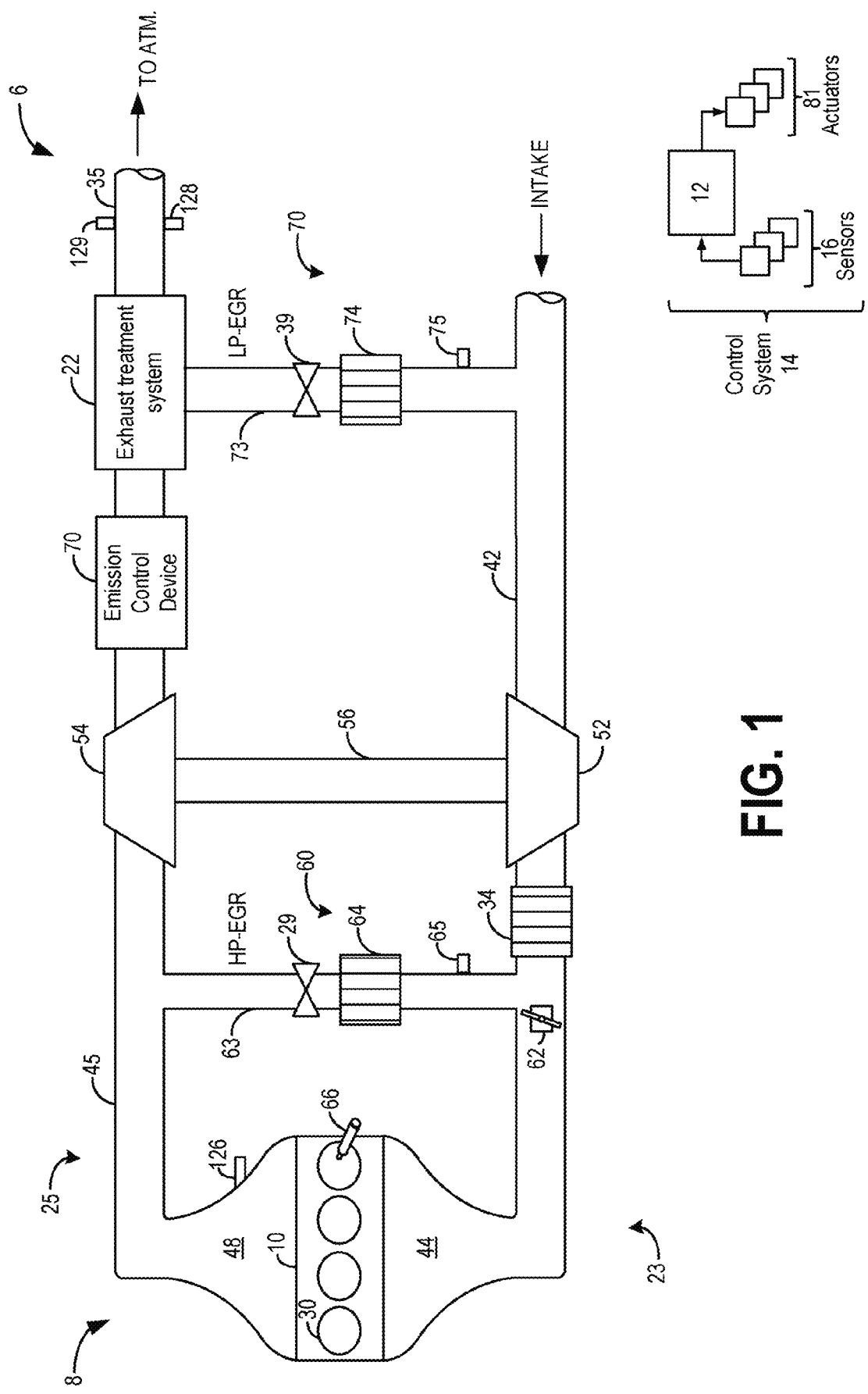
FIG. 1 shows a schematic depiction of an internal combustion engine and an associated exhaust treatment system.
Figure 5:
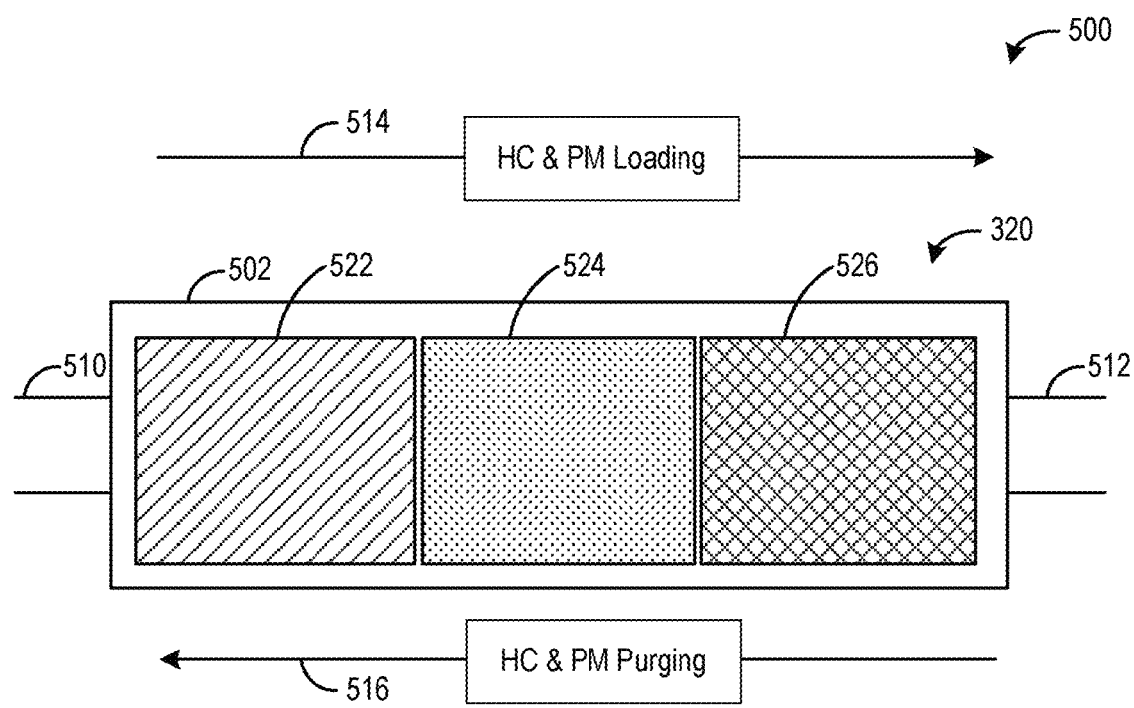
FIGS. 5-6 show alternate embodiments of a trap assembly of the exhaust treatment system of FIG. 3A.
Figure 6:
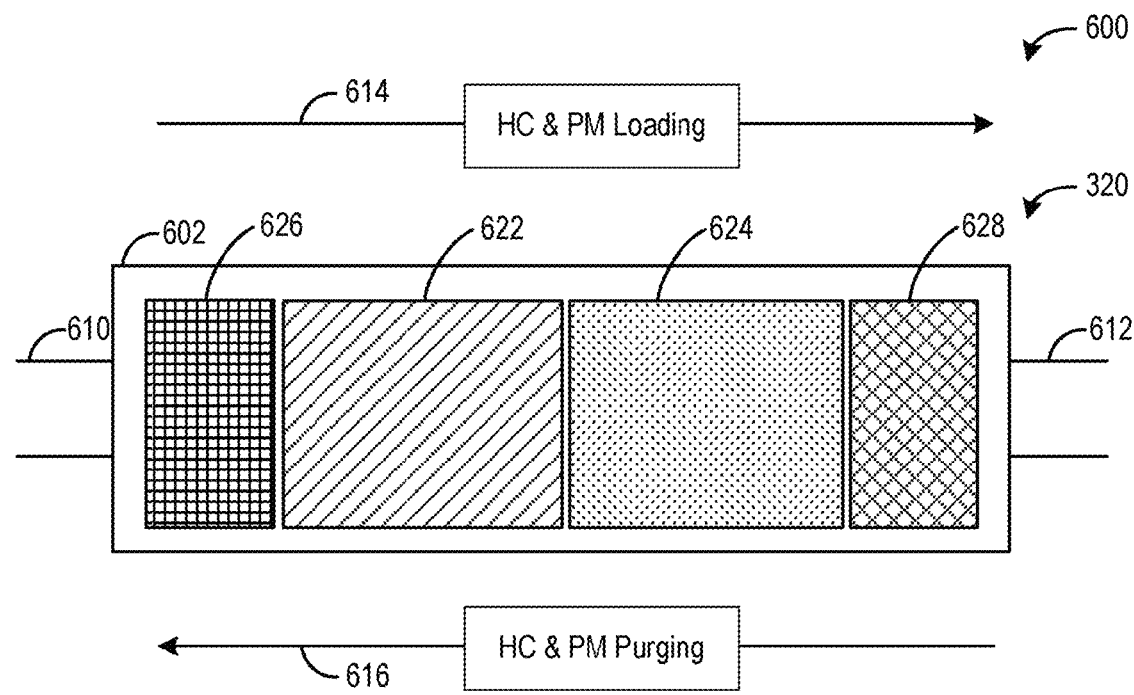
Figure 9:
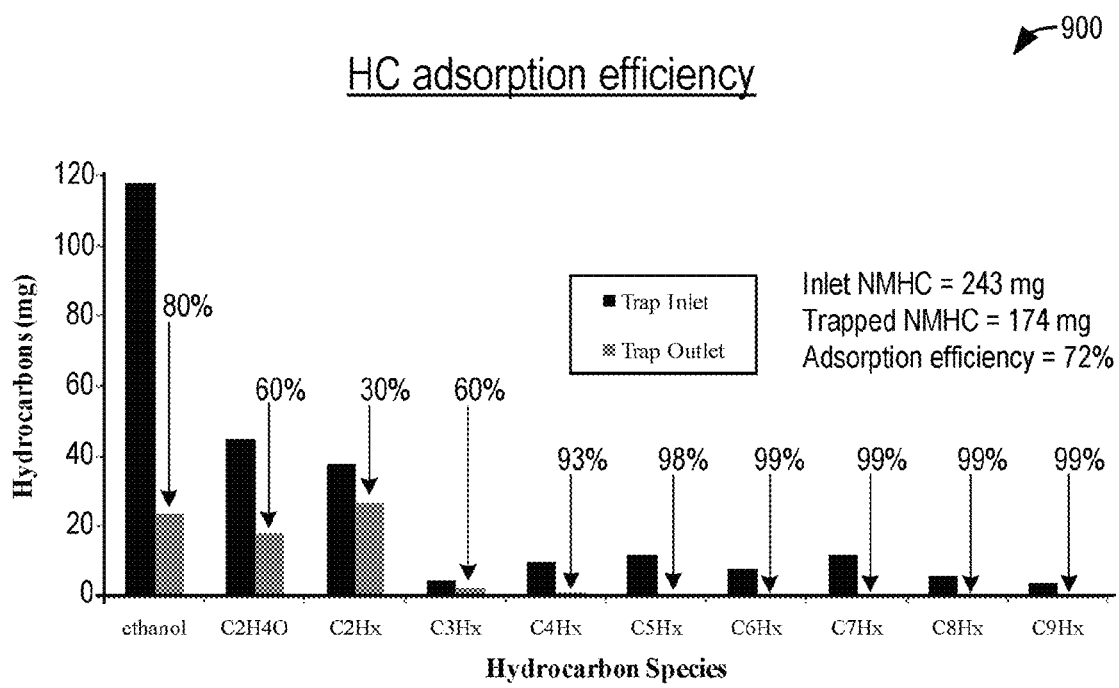
FIG. 9 shows a plot of the hydrocarbon adsorption efficiency of an example trap assembly of the present disclosure.
Figure 10:
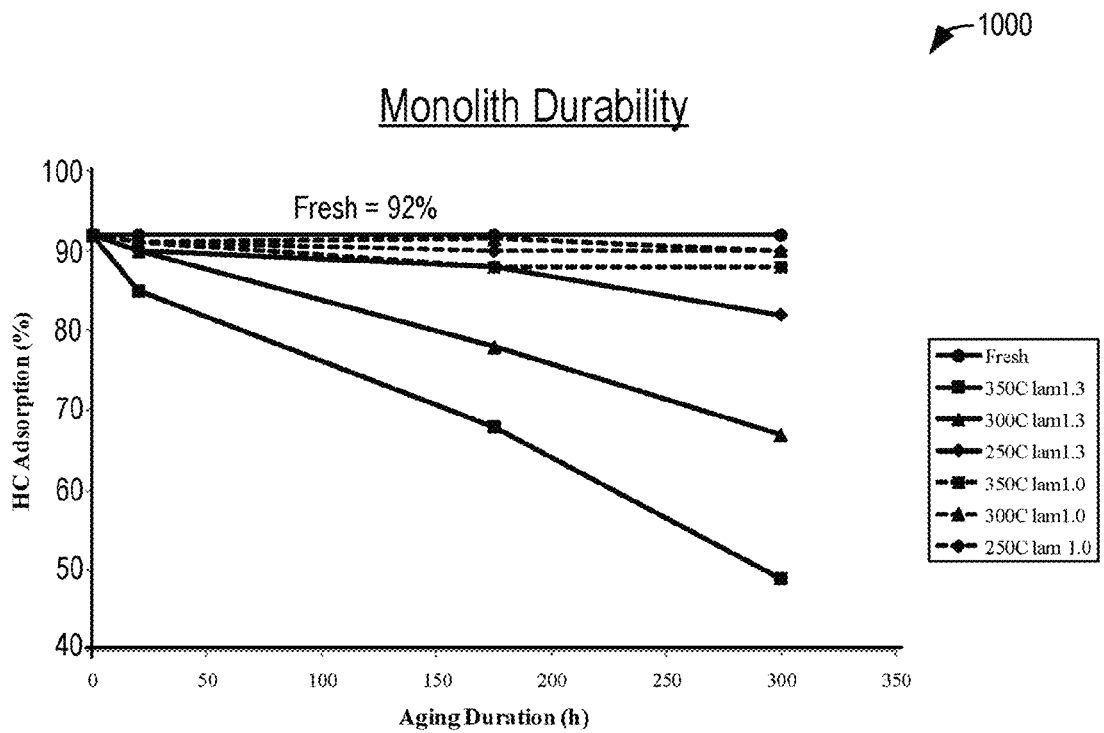
FIG. 10 shows a plot of the monolith durability of an example trap assembly of the present disclosure.
Figure 12:
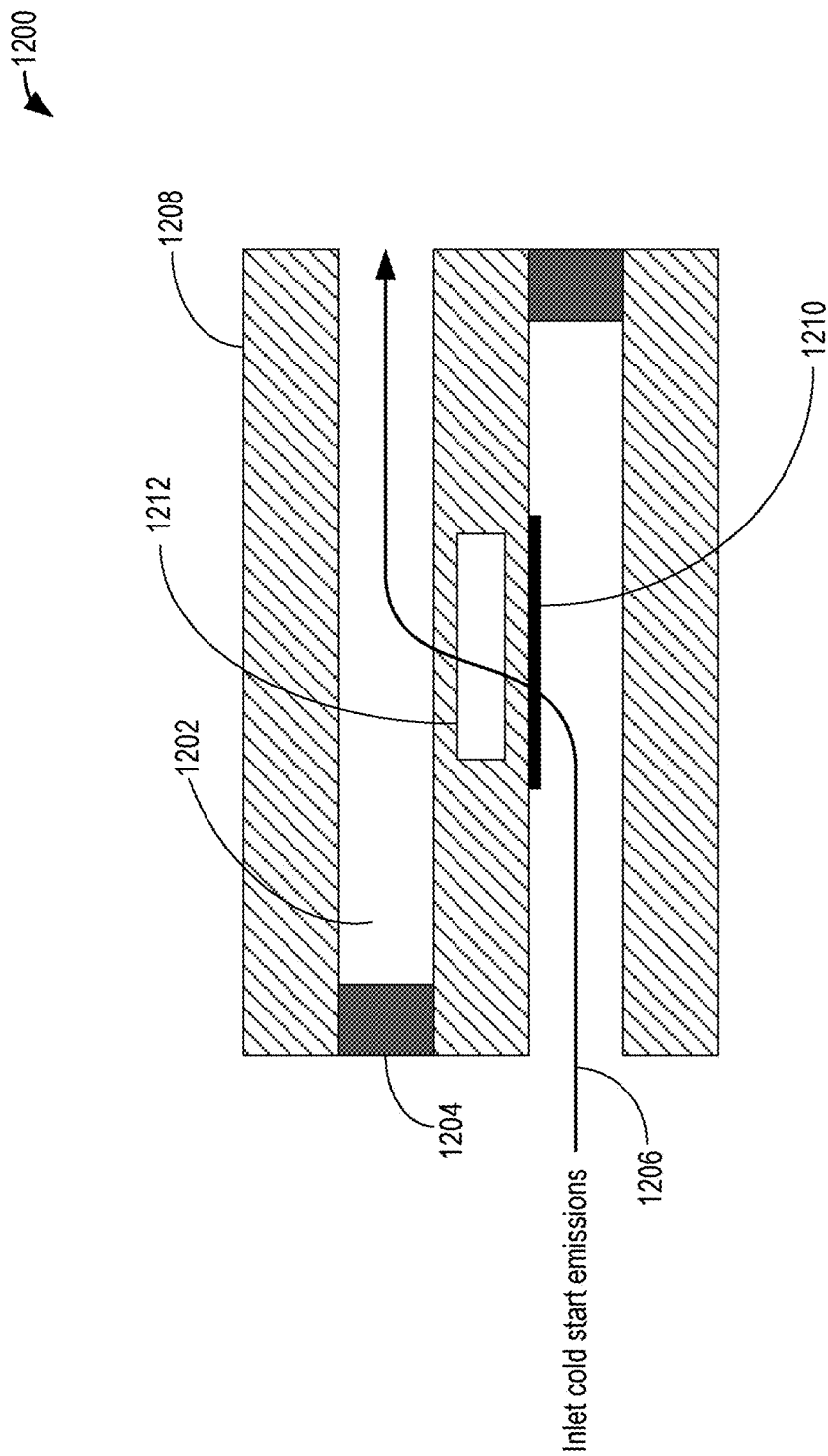
FIG. 12 shows an example of a combination HC trap/PM filter that may be used in the trap assembly of FIG. 3A.

The following description relates to systems and methods for operating an exhaust treatment system associated with an internal combustion engine for removing hydrocarbons and particulate matter from exhaust emissions. As shown in FIG. 1, by coupling the exhaust treatment system with a low pressure EGR system of the engine, advantageous synergies may be attained between the two systems. As shown in FIGS. 3A-E, and 4A-C, by coordinating the opening of various exhaust treatment system valves (such as a diverter valve, a purge valve, an isolation valve, and an exhaust throttle) with an EGR valve of the EGR system, cold start emission HCs and PMs may be effectively trapped for later reaction, or recirculated into the engine intake system. As shown in FIGS. 5-6, the trap assembly of the exhaust treatment system may be configured with HC traps and particulate matter filters to effectively reduce the HC and PM content of exhaust emissions. Alternatively, as shown in FIG. 12, the trap assembly may include a combination HC trap/PM filter. As illustrated in FIGS. 9-11, the described systems and methods may enable improved HC adsorption efficiencies and improved stored HC removal efficiencies, without degrading trap durability. An engine controller may be configured to perform a routine, such as the routine of FIG. 7, to appropriately coordinate the opening/closing of the exhaust treatment system valves with the opening/closing of an EGR valve. By performing such routines, cold start HC and PM emissions may be trapped until a threshold temperature, such as a catalyst light-off temperature, is attained. Alternatively, the stored HCs and PMs may be recirculated into the engine intake using an EGR flow. Further still, an EGR flow may be provided while bypassing the exhaust treatment system. In this way, by synergizing an engine exhaust treatment system with the EGR system, the number of components in the system may be reduced while improving the quality of exhaust emissions.

FIG. 1 shows a schematic depiction of a vehicle system 6. The vehicle system 6 includes an engine system 8 coupled to an exhaust treatment system 22. The engine system 8 may include an engine 10 having a plurality of cylinders 30. The engine 10 includes an intake 23 and an exhaust 25. The intake 23 includes a throttle 62 fluidly coupled to the engine intake manifold 44 via an intake passage 42. The exhaust 25 includes an exhaust manifold 48 leading to an exhaust passage 45 that routes exhaust gas to the atmosphere via tailpipe 35. Exhaust passage 45 may include one or more emission control devices 70, which may be mounted in a close-coupled position in the exhaust. One or more emission control devices may include a three-way catalyst, lean NOx trap, oxidation catalyst, etc.

Engine 10 may further include a boosting device, such as a turbocharger, including a compressor 52 arranged along intake passage 42. Compressor 52 may be at least partially driven by a turbine 54, arranged along exhaust passage 45, via shaft 56. In alternate embodiments, the boosting device may be a supercharger, wherein compressor 52 may be at least partially driven by the engine and/or an electric machine, and may not include a turbine. The amount of boost (or compression) provided to one or more cylinders of the engine via a turbocharger or supercharger may be varied by controller 12. In some embodiments, an optional charge after-cooler 34 may be included downstream of compressor 52 in intake passage 42. The after-cooler may be configured to reduce the temperature of the intake air compressed by the boosting device.

Engine 10 may further include one or more exhaust gas recirculation (EGR) systems configured to route a portion of exhaust gas from exhaust passage 45 to intake passage 42. For example, engine 10 may include a first high pressure-EGR (HP-EGR) system 60 and a second low pressure-EGR (LP-EGR) system 70. HP-EGR system 60 may include HP-EGR passage 63, HP-EGR valve 29, and HP-EGR cooler 64. Specifically, HP-EGR passage 63 may be configured to route a portion of exhaust gas from exhaust passage 45, upstream of turbine 54, to intake passage 42, downstream of compressor 52, and upstream of throttle 62. As such, HP-EGR system 60 may be operated when no boost is provided by the boosting device. LP-EGR system 70 may include LP-EGR passage 73, LP-EGR valve 39, and LP-EGR cooler 74. LP-EGR passage 73 may be configured to route a portion of exhaust gas from exhaust passage 45, downstream of turbine 54, to intake passage 42, upstream of compressor 52 and throttle 62. LP-EGR system 70 may be operated in the presence or absence of boost from the boosting device. HP-EGR cooler 64 and LP-EGR cooler 74 may be configured to lower the temperature of exhaust gas flowing through the respective EGR passages before recirculation into the engine intake. It will be appreciated that other components may be included in engine 10, such as a variety of valves and sensors, as described herein and as shown in the example engine of FIGS. 2-4.

The amount and/or rate of HP-EGR provided to intake manifold 44 may be varied by controller 12 via HP-EGR valve 29. HP-EGR sensor 65 may be positioned within HP-EGR passage 63 to provide an indication of one or more of a pressure, temperature, composition, and concentration of exhaust gas recirculated through HP-EGR system 60. Similarly, the amount and/or rate of LP-EGR provided to intake passage 42 may be varied by controller 12 via LP-EGR valve 39. LP-EGR sensor 75 may be positioned within LP-EGR passage 73 to provide an indication of one or more of a pressure, temperature, composition, and concentration of exhaust gas recirculated through LP-EGR system 70.

Under some conditions, exhaust gas recirculation through HP-EGR system 60 and/or LP-EGR system 70 may be used to regulate the temperature of the air and fuel mixture within the intake manifold, and/or reduce $NO_x$ formation of combustion by reducing peak combustion temperatures, for example. As elaborated herein with reference to FIGS. 3A-E and 4A-C, under some conditions, for example purging conditions, an EGR flow through the exhaust treatment system 22 and the LP-EGR system 70 may also be used to purge stored hydrocarbons and particulate matter from exhaust treatment system 22 into the engine intake. Specifically, by coupling exhaust treatment system 22 to LP-EGR system 70, advantageous synergies between the exhaust treatment system and the EGR system may be achieved.

Exhaust treatment system 22 may be coupled to exhaust 25 along exhaust passage 45. In one example, when exhaust passage 45 includes an exhaust throttle and an exhaust cooler, exhaust treatment system 22 may be positioned downstream of the exhaust throttle and upstream of the exhaust cooler. Under some operating conditions, for example, when the emission control device is not yet at its light-off temperature (e.g., a temperature at which the device reaches a selected, sufficiently high, conversion efficiency for a particular exhaust constituent), exhaust gases may be routed to exhaust treatment system 22, before being vented to the atmosphere along tailpipe 35. In this way, an increased amount of cold start hydrocarbon (HC) and particulate matter (PM) emissions may be stored in exhaust treatment system 22 while the exhaust gases heat emission control device 70. Then, once the emission control device 70 has reached its operating temperature, the retained HCs and PMs may be purged from exhaust treatment system 22 to the engine intake 23 via LP-EGR passage 73, as described below herein.

Engine 10 may be controlled at least partially by a control system 14 including controller 12 and by input from a vehicle operator via an input device (not shown). Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, exhaust temperature sensor 128 and exhaust pressure sensor 129 located downstream of the emission control device and exhaust treatment system in tailpipe 35, HP-EGR sensor 65 located in HP-EGR passage 63, and LP-EGR sensor 75 located in LP-EGR passage 73. Other sensors such as additional pressure, temperature, air/fuel ratio and composition sensors may be coupled to various locations in the vehicle system 6. As another example, actuators 81 may include fuel injector 66, HP-EGR valve 29, LP-EGR valve 39, and throttle 62. Other actuators, such as a variety of additional valves and throttles, may be coupled to various locations in the vehicle system 6, for example, as described herein in FIGS. 3-4 with regard to the various valves and throttles of exhaust treatment system 22. Controller 12 may receive input data from the various sensors, process the input data, and trigger the actuators in response to the processed input data based on instruction or code programmed therein corresponding to one or more routines. An example control routine is described herein with regard to FIG. 7.

Figure 2:
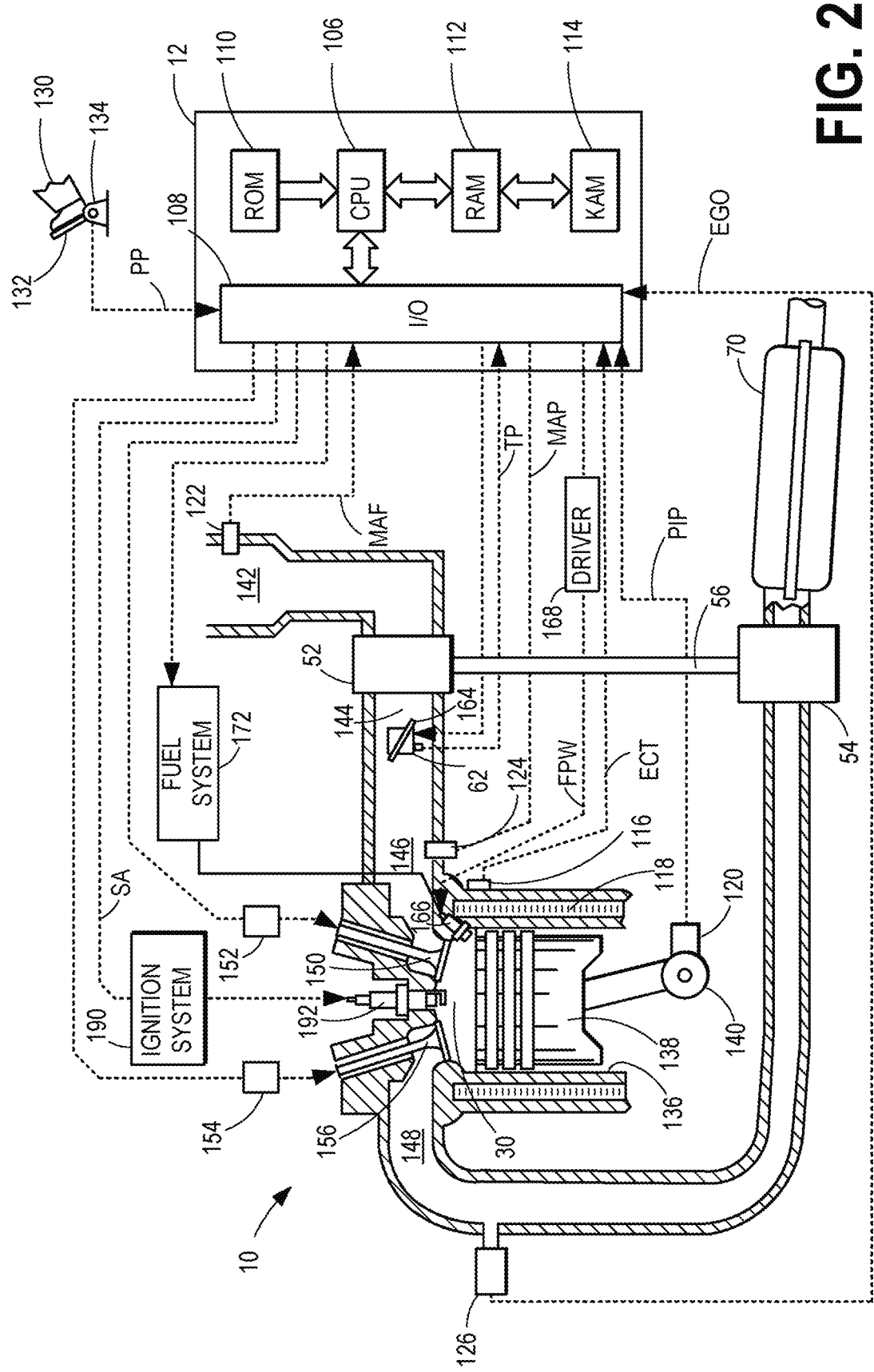
FIG. 2 shows an example embodiment of a combustion chamber operating with a direct fuel injector.

FIG. 2 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 52 arranged between intake passages 142 and 144, and an exhaust turbine 54 arranged along exhaust passage 148. Compressor 52 may be at least partially powered by exhaust turbine 54 via a shaft 56. However, in other examples, such as where engine 10 is provided with a supercharger, exhaust turbine 54 may be optionally omitted, where compressor 52 may be powered by mechanical input from a motor or the engine. Further still, shaft 56 may be coupled to an electric motor (as depicted in FIG. 1) to provide an electric boost, as needed. A throttle 62 including a throttle plate 164 may be provided along an intake passage of the engine for varying the flow rate and/or pressure of intake air provided to the engine cylinders. For example, throttle 62 may be disposed downstream of compressor 52 as shown in FIG. 2, or may be alternatively provided upstream of compressor 52.

Exhaust passage 148 can receive exhaust gases from other cylinders of engine 10 in addition to cylinder 30. Exhaust gas sensor 126 is shown coupled to exhaust passage 148 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 70 may be a three way catalyst (TWC), NOx trap, various other emission control devices, or combinations thereof.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 30 may alternatively include an intake valve controlled via electric valve actuation, and an exhaust valve controlled via cam actuation including CPS and/or VCT. In other embodiments, the intake and exhaust valves may be controlled by a common valve actuator or actuation system, or a variable valve timing actuator or actuation system. The engine may further include a cam position sensor whose data may be merged with the crankshaft position sensor to determine an engine position and cam timing.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including fuel injector 166 coupled directly to cylinder 30. Fuel injector 166 may inject fuel directly therein in proportion to the pulse width of signal FPW received from controller 12 via electronic driver 168. In this manner, fuel injector 166 provides what is known as direct injection (hereafter referred to as "DI") of fuel into combustion cylinder 30. While FIG. 2 shows injector 166 as a side injector, it may also be located overhead of the piston, such as near the position of spark plug 192. Alternatively, the injector may be located overhead and near the intake valve. Fuel may be delivered to fuel injector 166 from high pressure fuel system 172 including a fuel tank, fuel pumps, and a fuel rail. Alternatively, fuel may be delivered by a single stage fuel pump at lower pressure. Further, while not shown, the fuel tank may have a pressure transducer providing a signal to controller 12.

It will be appreciated that in an alternate embodiment, injector 166 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Controller 12 is shown in FIG. 2 as a microcomputer, including microprocessor 106, input/output ports 108, an electronic storage medium for executable programs and calibration values shown as read-only memory 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type, such as a crankshaft position sensor) coupled to crankshaft 140; throttle position (TP) from a throttle position sensor (not shown); and absolute manifold pressure signal (MAP) from sensor 124. Engine speed signal, RPM, may be generated by controller 12 from signal PIP (or the crankshaft position sensor). Manifold pressure signal MAP from a manifold pressure sensor may be used to provide an indication of vacuum, or pressure, in the intake manifold. Storage medium read-only memory 110 can be programmed with computer readable data representing instructions executable by microprocessor 106 for performing the methods described below as well as other variants that are anticipated but not specifically listed.

An exhaust gas recirculation (EGR) system (as illustrated in FIG. 1) may route a desired portion of exhaust gas from exhaust passage 148 to intake passage 144 via an EGR passage (not shown). The amount of EGR provided to the intake may be varied by controller 12 via an EGR valve (not shown). Further, an EGR sensor (not shown) may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes.

As described above, FIG. 2 shows only one cylinder of a multi-cylinder engine. As such each cylinder may similarly include its own set of intake/exhaust valves, fuel injector(s), spark plug, etc.

Now turning to FIGS. 3A-E, FIG. 3A shows an example embodiment of exhaust treatment system 22 in a first mode (Mode A) of operation. FIGS. 3B-E, respectively, show example embodiments of the exhaust treatment system of FIG. 3A in a first intermediate mode (Mode I), a second mode (Mode B), a second intermediate mode (Mode II) and a third mode (Mode C) of operation. FIGS. 4A-C depict an alternate embodiment of exhaust treatment system 22 in the first mode (Mode A), second mode (Mode B), and third mode (Mode C) of operation, respectively. It will be appreciated that like numbered components introduced in FIG. 3A may be referenced similarly in FIGS. 3B-E, and 4A-C.

Returning to FIG. 3A, it shows an example embodiment 300 of exhaust treatment system 22. Exhaust treatment system 22 may be configured to receive exhaust gas from an emission control device along exhaust passage 145 before venting the exhaust to the atmosphere through tailpipe 35. An exhaust throttle 302 may be included in exhaust passage 145 to enable exhaust throttling and control of flow and pressure of exhaust gases in the passage. In one example, exhaust throttle 302 may be a dual bore exhaust throttle valve including a single shaft with two plates offset by 90 degrees. Herein, the throttle may be adjusted between a full open and a fully closed position. In an alternate example, exhaust throttle 302 may be configured to provide a wide range of throttle opening angles. For example, exhaust throttle 302 may include one or more distinct valves and may not have a common shaft to enable a wider range of throttle opening angles. Herein, the throttle may be adjusted to be fully open, fully closed, or partially open.

A diverter valve 306 may be configured to divert at least some exhaust gas from exhaust passage 145 into bypass passage 245, via conduit 373, for example during cold start conditions. Bypass passage 245 may include a trap assembly 320 for retaining emission HCs and PMs. As further elaborated in FIGS. 5-6, trap assembly 320 may include one or more HC traps for retaining emission HCs, one or more PM filters for retaining emission PMs, and/or may include combination HC trap/PM filters (as described in FIG. 12). Bypass passage 245 may be coupled to LP-EGR passage 73 near the inlet of trap assembly 320. Herein, conduit 373 may substantially extend into LP-EGR passage 73.

When opened, diverter valve 306 may divert exhaust gas into bypass passage 245 at a position near the inlet of trap assembly 320. Exhaust gas passed through trap assembly 320 may then be vented to the atmosphere along exhaust conduit 310. Flow of exhaust gases from trap assembly 320 through exhaust conduit 310 may be regulated by isolation valve 304. Isolation valve 304 may enable additional exhaust throttling and may aid in achieving a desired EGR flow rate. In one example, as shown, the actuation of exhaust throttle 302 and isolation valve 304 may be coupled by a first actuation coupler 311 to a first actuator 303. Thus, in one example, the closing of exhaust throttle 302 may be coupled to the opening of isolation valve 304 through the actuation of first actuator 303. In alternate examples, the exhaust throttle and isolation valve may be actuated independently by distinct actuators.

Purge valve 308 may also be configured to divert at least some exhaust gas from exhaust passage 145 into bypass passage 245 along purge conduit 312, for example, during purging conditions after a catalyst light-off temperature has been reached. Specifically, purge valve 308 may divert exhaust gas into bypass passage 245 at a position near the outlet of trap assembly 320. Herein, purge conduit 312 may be substantially parallel to conduit 373 and LP-EGR passage 73. In this way, exhaust gases may be used to purge stored HCs and PMs from trap assembly 320. The purged exhaust may then be recirculated to the engine intake along LP-EGR passage 73. Flow of purged exhaust gases from trap assembly 320 into LP-EGR passage 73 may be regulated by LP-EGR valve 39. In one example, as shown, the actuation of diverter valve 306 and purge valve 308 may be coupled by second actuation coupler 309 to a second actuator 307. Thus, in one example, the closing of purge valve 308 may be coupled to the opening of diverter valve 306 through the actuation of second actuator 307. However, in alternate examples, the diverter valve and purge valve may be actuated independently by distinct actuators. In still other examples, the actuation of one or more of the diverter valve, purge valve, isolation valve, and exhaust throttle may be coupled to the actuation of LP-EGR valve 39.

Exhaust treatment system 22 may be operated by a controller in a plurality of modes by selective adjustment of the various valves. For example, the following operating modes may be performed:

MODE A: Exhaust HC and PM storage
MODE I: Intermediate cold engine operation
MODE B: Trap assembly purging
MODE II: Intermediate idle engine operation
MODE C: EGR The configuration of the various valves and throttles of exhaust treatment system 22 in the various operating modes is detailed herein and summarized in the table of FIG. 8.

Returning to FIG. 3A, it shows an example configuration of the various valves of exhaust treatment system 22 in a first operating mode (Mode A, exhaust HC and PM storage). During select engine and/or vehicle operating conditions, such as during an engine cold start condition (for example, when the engine and/or a catalytic converter is cold), controller 12 may close exhaust throttle 302 and open isolation valve 304, for example, by adjusting first actuator 303. Additionally, controller 12 may close purge valve 308 and open diverter valve 306, for example, by adjusting second actuator 307. Further still, the controller may close LP-EGR valve 39. In this configuration, exhaust from the engine is diverted into bypass passage 245 and trap assembly 320 before being vented to the atmosphere via isolation valve 304 and tailpipe 35. Specifically, exhaust may be configured to flow through the trap assembly 320 of exhaust treatment system 22 to the tailpipe while bypassing the LP-EGR system. In this way, untreated exhaust hydrocarbons and particulates emitted from an inactive catalytic converter may be substantially removed from the exhaust before venting to the atmosphere. During the storing operation, a temperature sensor (for example, exhaust temperature sensor 128) may be used to determine a temperature of the exhaust and/or infer a temperature of the emission control device and accordingly adjust the duration of each mode and/or a transition between modes. In this way, the first operating mode, Mode A, enables storing of hydrocarbons and particulate matter from the engine exhaust in the trap assembly.

FIG. 3B shows an example configuration 350 of the various valves of exhaust treatment system 22 in a first intermediate operating mode (Mode I, intermediate cold engine operation). During select engine and/or vehicle operating conditions, such as a first intermediate condition following the engine cold start condition and preceding a purging condition, including after a catalyst light-off temperature has been reached, but before EGR-conducive exhaust temperatures are reached, controller 12 may open (for example, fully open or partially open) exhaust throttle 302 and close isolation valve 304, for example, by adjusting first actuator 303. Additionally, controller 12 may open purge valve 308 and close diverter valve 306, for example, by adjusting second actuator 307. Further still, the controller may close LP-EGR valve 39. In this configuration, exhaust gases may be routed along exhaust passage 145 through the exhaust treatment system and vented to the atmosphere through the exhaust tailpipe, after treatment by the emission control device, while bypassing the trap assembly. That is, trap assembly 320 may be isolated from the exhaust gas and the EGR system, and the retained HCs and PMs may remain stored in the trap assembly 320 with limited slip. In this way, the first intermediate operating mode enables intermediate cold engine operation and defers purging of the stored HCs and PMs until a desired exhaust temperature (for example, an engine temperature favoring EGR operations) is attained.

FIG. 3C shows an example configuration 360 of the various valves of exhaust treatment system 22 in a second operating mode (Mode B, trap assembly purging). During select engine and/or vehicle operating conditions, such as after a catalyst light-off temperature and EGR-conducive exhaust temperatures have been reached, controller 12 may open (for example, fully open or partially open) exhaust throttle 302 and close isolation valve 304, for example, by adjusting first actuator 303. Additionally, controller 12 may open purge valve 308 and close diverter valve 306, for example, by adjusting second actuator 307. Further still, the controller may open LP-EGR valve 39. In this configuration, warmed-up exhaust from the engine is diverted into bypass passage 245 via purge conduit 312, and then on to trap assembly 320 for purging the stored HCs and PMs into the engine intake along EGR passage 73. As such, in this configuration, exhaust may be configured to flow from the outlet of trap assembly 320 towards the inlet of trap assembly 320 (that is, in a direction of flow opposite to used during the storage operation of the first mode, Mode A). In one example, controller 12 may be configured to adjust the duty cycle of at least purge valve 308 based on a feedback regarding the exhaust temperature as determined by a temperature sensor, such as exhaust temperature sensor 128. The duty cycle may be adjusted to enable a desired exhaust inlet gas temperature to be provided. In one example, the desired exhaust temperature may be adjusted as a function of the exhaust gas oxygen content. By coordinating the duty cycle of the purge valve based on temperature feedback, a desired trap assembly inlet temperature and a desired exhaust flow velocity through the trap assembly may be achieved to effectively clean the trap of stored HCs and PMs.

In this way, second operating mode, Mode B, enables stored HCs and PMs from the trap assembly to be purged into, and be combusted by, the engine. Specifically, in the second operating mode, exhaust gas may be routed through the trap assembly of the exhaust treatment system and then the LP-EGR system before being diverted to the engine intake. That is, a purge flow may also be used as an EGR flow. By directing the purge flow into the intake manifold as a cooled EGR flow, the second operating mode enables synergies to be achieved between the exhaust treatment system and the LP-EGR system.

FIG. 3D shows an example configuration 370 of the various valves of exhaust treatment system 22 in a second intermediate operating mode (Mode II, intermediate idle engine operation). During select engine and/or vehicle operating conditions, such as a second intermediate condition following the purging condition and preceding an EGR condition, including conditions when exhaust temperatures are above a threshold temperature (for example, a temperature above which the exhaust may deteriorate the trap assembly material, such as above 400° C.), at engine idle speed, and/or when no EGR is desired, controller 12 may open (for example, fully open or partially open) exhaust throttle 302 and close isolation valve 304, for example, by adjusting first actuator 303. Additionally, controller 12 may open purge valve 308 and close diverter valve 306, for example, by adjusting second actuator 307. Further still, the controller may close LP-EGR valve 39. In this configuration, exhaust gases may be vented to the atmosphere and trap assembly 320 may be isolated from hot lean exhaust. In this way, exhaust gases may be routed along exhaust passage 145 through the exhaust treatment system and vented to the atmosphere through the exhaust tailpipe, after treatment by the emission control device, while bypassing the trap assembly. In one example, controller 12 may be further configured to adjust the duty cycle of at least purge valve 308 (for example, causing it to be rapidly moved towards zero) based on feedback regarding the exhaust temperature from exhaust temperature sensor 128. In this way, the second intermediate operating mode enables intermediate idle engine operation and reduces degradation of trap assembly (such as trapping materials, trap filters, trap support structures, etc.) by the heated exhaust.

FIG. 3E shows an example configuration 380 of the various valves of exhaust treatment system 22 in a third mode of operation (Mode C, EGR). During select engine and/or vehicle operating conditions, such as after completion of a trap assembly purging operation and/or when only EGR is desired, controller 12 may open (for example, fully open or partially open) exhaust throttle 302 and close isolation valve 304, for example, by adjusting first actuator 303. Additionally, controller 12 may close purge valve 308 and open diverter valve 306, for example, by adjusting second actuator 307. Further still, the controller may open LP-EGR valve 39. In this configuration, exhaust from the engine may be routed to the engine intake along EGR passage 73. As such, in this configuration, trap assembly 320 may remain isolated from the EGR exhaust flow. In this way, by routing exhaust gas through the EGR system while bypassing trap assembly of the exhaust treatment system, the third operating mode enables an EGR operation to be performed independent of an exhaust treatment operation.

FIGS. 4A-C show an alternate embodiment of exhaust treatment system 22 in the first mode (Mode A, exhaust HC and PM storage), second mode (Mode B, trap assembly purging), and third mode (Mode C, EGR) of operation, respectively. It will be appreciated that like numbered components introduced in FIGS. 3A and 4A may be referenced similarly in FIGS. 4B-C.

Returning to FIG. 4A, it shows an example embodiment 400 of exhaust treatment system 22. Exhaust gas may be received from an emission control device along exhaust passage 145 before being vented to the atmosphere through tailpipe 35. Exhaust throttle 402 may be included in exhaust passage 145. Herein, diverter valve 406 may be positioned in bypass passage 245, upstream of trap assembly 320. When opened, diverter valve 406 may receive at least some exhaust gas from exhaust passage 145, via conduit 473, and divert the exhaust gas into bypass passage 245, for example during cold start conditions. As further elaborated in FIGS. 5-6, trap assembly 320 may include one or more HC traps, one or more PM filters, and/or one or more combination HC trap/PM filters. Bypass passage 245 may be coupled to LP-EGR passage 73 near the inlet of trap assembly 320. Herein, (unlike the example embodiment of FIGS. 3A-E) conduit 473 may not substantially extend into LP-EGR passage 73.

Upon passage through trap assembly 320, exhaust gas may be vented to the atmosphere along exhaust conduit 410 via isolation valve 404. In one example, actuation of exhaust throttle 402 and isolation valve 404 may be coupled by first actuation coupler 411 to first actuator 403 such that first actuator 403 may be configured to close exhaust throttle 402 while opening isolation valve 404. In alternate examples, the exhaust throttle and isolation valve may be actuated independently by distinct actuators.

Purge valve 408, positioned within purge conduit 412, may divert at least some exhaust gas from exhaust passage 145, received via conduit 473, into bypass passage 245 along purge conduit 412, for example, during purging conditions, at a position near the outlet of trap assembly 320. Herein, purge conduit 412 may be substantially parallel to bypass passage 245 and exhaust passage 145. Following flow through trap assembly 320, purged exhaust may be recirculated to the engine intake along LP-EGR passage 73 via LP-EGR valve 39. In one example, actuation of diverter valve 406 and purge valve 408 may be coupled by second actuation coupler 409 to second actuator 407. For example, second actuator 407 may be configured to open diverter valve 406 while closing purge valve 408. However, in alternate examples, the diverter valve and purge valve may be actuated independently by distinct actuators. In still other examples, the actuation of one or more of the diverter valve, purge valve, isolation valve, and exhaust throttle may be coupled to the actuation of LP-EGR valve 39.

Herein, the configuration of the various valves of exhaust treatment system 22 in the first operating mode (Mode A, exhaust HC and PM storage) may be substantially the same as previously indicated in FIG. 3A and table 800 (FIG. 8). Specifically, during select engine and/or vehicle operating conditions, such as during an engine cold start, controller 12 may close exhaust throttle 402 and open isolation valve 404, for example, by adjusting first actuator 403. Additionally, controller 12 may close purge valve 408 and open diverter valve 406, for example, by adjusting second actuator 407. Further still, the controller may close LP-EGR valve 39. In this configuration, exhaust from the engine travels along conduit 473 into bypass passage 245 from where diverter valve 406 directs the exhaust into trap assembly 320 before venting the exhaust to the atmosphere through isolation valve 404, exhaust conduit 410, and tailpipe 35. In this way, untreated exhaust hydrocarbons and particulates emitted from an inactive catalytic converter may be substantially removed from the exhaust before venting to the atmosphere. A temperature sensor (for example, exhaust temperature sensor 128) may be used to determine a temperature of the exhaust and/or infer a temperature of the emission control device and accordingly adjust the duration of each mode and/or a transition between modes.

FIG. 4B shows an example configuration 460 of the various valves of exhaust treatment system 22 in the second mode of operation (Mode B, trap assembly purging). During select engine and/or vehicle operating conditions, such as after a catalyst light-off temperature and EGR-conducive exhaust temperatures have been reached, controller 12 may open (for example, fully open or partially open) exhaust throttle 402 and close isolation valve 404, for example, by adjusting first actuator 403. Additionally, controller 12 may open purge valve 408 and close diverter valve 406, for example, by adjusting second actuator 407. Further still, the controller may open LP-EGR valve 39. In this configuration, warmed-up exhaust from the engine is diverted into purge conduit 412 by purge valve 408 from where the exhaust is directed into bypass passage 245 and trap assembly 320, at a position near the outlet of trap assembly 320. From here, the purge flow may be directed to the engine intake along EGR passage 73 via LP-EGR valve 39. Thus, the purge flow may also be used as an EGR flow. Controller 12 may adjust the duty cycle of purge valve 408 based on feedback from exhaust temperature sensor 128, for example. The duty cycle may be adjusted to enable a desired exhaust inlet gas temperature to be provided, for example, as a function of the exhaust gas oxygen content.

FIG. 4C shows an example configuration 480 of the various valves of exhaust treatment system 22 in the third mode of operation (Mode C, EGR). During select engine and/or vehicle operating conditions, such as after completion of a trap assembly purging operation and/or when only EGR is desired, controller 12 may open (for example, fully open or partially open) exhaust throttle 402 and close isolation valve 404, for example, by adjusting first actuator 403. Additionally, controller 12 may close purge valve 408 and open diverter valve 406, for example, by adjusting second actuator 407. Further still, the controller may open LP-EGR valve 39. In this configuration, exhaust from the engine may be routed along conduit 473 into bypass passage 245 from where diverter valve 406 may direct the exhaust into the engine intake along EGR passage 73. Thus, exhaust may be routed to the engine intake through the EGR system while bypassing the trap assembly of the exhaust treatment system. That is, trap assembly 320 may remain isolated from the EGR exhaust flow. Thus, Mode C enables an EGR operation to be performed independent of the exhaust treatment system.

In this way, based on the engine conditions, flow of exhaust through the exhaust treatment system and the EGR system may be adjusted. In one example, a transition between the various operating modes may be based on at least one of an exhaust gas temperature and an emission control device temperature.

Now turning to FIGS. 5-6, example embodiments (500 and 600) of trap assembly 320 are shown. Trap assembly 320 may include a trap housing 502, 602 for encasing trap assembly constituents. Trap housing 502, 602 may be made of plastic or steel, for example. Trap assembly 320 may include one or more HC traps for retaining exhaust HCs, and one or more particulate matter filters (herein also referred to as just "filters") for retaining exhaust PMs.

In one example, as depicted in example embodiment 500 of FIG. 5, trap assembly 320 may include a first HC trap 522, a second HC trap 524 and a first filter 526. Further, the HC traps and filters may be arranged in various orders. For example, first HC trap 522 may be positioned near the inlet 510 of trap assembly 320 while first filter 526 may be positioned near the outlet 512 of trap assembly 320. Second HC trap 524 may be positioned, for example, between first HC trap 520 and first filter 526. In this configuration, during a loading (or storing) operation, exhaust may flow through first HC trap 522, second HC trap 524, and first filter 526, in that order (as indicated by arrow 514). In contrast, during a purging operation, exhaust may flow through first filter 526, second HC trap 524, and first HC trap 522, in that order (as indicated by arrow 516).

In another example, as depicted in example embodiment 600 of FIG. 6, trap assembly 320 may include a first HC trap 622, a second HC trap 624, a first filter 626, and a second filter 628, encased in trap housing 602. The HC traps and filters may be arranged in various orders. For example, first filter 626 may be positioned near the inlet 610 of trap assembly 320 while second filter 628 may be positioned near the outlet 612 of trap assembly 320. First HC trap 622 and second HC trap 624 may be positioned, for example, between the first and second filters with the first HC trap 622 proximal to the first filter 626 and the second HC trap 624 proximal to the second filter 628. In this configuration, during a loading (or storing) operation, exhaust may flow through first filter 626, first HC trap 622, second HC trap 624, and second filter 628, in that order (as indicated by arrow 614). In contrast, during a purging operation, exhaust may flow through second filter 628, second HC trap 624, first HC trap 622, and first filter 626, in that order (as indicated by arrow 616).

In one example, the HC traps may be in the form of a brick or monolith (for example, an extruded monolith) comprising a base substrate layered with one or more appropriate HC adsorbents. In another example, the HC traps may include pellets of the appropriate adsorbent. HC trap adsorbents may be selected such that a maximum amount of HCs may be adsorbed during HC storing while allowing maximum desorption of HCs during HC purging at a low enough temperature without aging the trap. The selected adsorbents may also have high durability to prevent deterioration due to heat or poisoning from the exhaust gas. For example, the HC traps may include at least one of activated carbon and catalyzed zeolites.

The adsorbents used may differ in porosity. For example, the HC trap and/or filter near the inlet of the trap assembly may include an adsorbent of larger porosity (for example, for trapping larger chain HCs and PMs) while the HC trap and/or filter near the outlet of the trap assembly may include an adsorbent of smaller porosity (for example, for trapping smaller chain HCs and PMs). Additionally or optionally, the adsorbents used may differ in chemical characteristics. For example, the HC trap and/or filter near the inlet of the trap assembly may include an adsorbent with a higher affinity for longer chain HCs and larger PMs while the HC trap and/or filter near the outlet of the trap assembly may include an adsorbent with a higher affinity for shorter chain HCs and smaller PMs. In one example, by positioning a trap/filter of larger porosity before a trap/filter of smaller porosity, in the direction of exhaust flow during a storing operation, potential issues related to trap/filter clogging may be reduced.

In one example, first HC trap (522, 622) may include macroporous activated carbon (for example, in monolith form or pellet form) while second HC trap (524, 624) may include microporous activated carbon (for example, in monolith form or pellet form). In another example, first HC trap may include macroporous catalyzed zeolites (for example, in monolith form or pellet form), while second HC trap may include microporous catalyzed zeolites (for example, in monolith form or pellet form). The catalyzed zeolites may include a variety of ion-exchanged zeolites such as copper-exchanged zeolites and iron-exchange zeolites. In still other examples, a combination of activated carbon based traps and zeolites based traps may be used, for example, a first HC trap of macroporous activated carbon and a second HC trap of microporous zeolite.

The combination of adsorbents may also be adjusted based on the range of trap assembly inlet temperatures desired or expected. For example, activated carbon based traps may be used for lower inlet temperatures (for example, not exceeding 350° C.), while catalyzed zeolite based traps may be used for higher inlet temperatures (for example, up to 600° C.).

The first and second PM filters may include, for example, at least one of diesel particulate filters, activated carbon pellets (microporous or macroporous), catalyzed zeolite pellets (microporous or macroporous), porous blocks of zeolite, metal screens of various gauges, natural fibers (such as cotton and/or paper), composite fibers, and foam blocks.

While the depicted examples illustrate a trap/filter of larger porosity positioned before a trap/filter of smaller porosity, in the direction of exhaust flow during a storing operation, in alternate examples, a trap/filter of smaller porosity may be positioned before a trap/filter of larger porosity, in the direction of exhaust flow during a storing operation. In still other examples, the first and second traps may have the same composition and/or porosity, and the first and second filters may also have the same composition and/or porosity. In still other examples, the EGR cooler channels may be coated with catalyzed zeolite and may be used as a HC trap.

In still other examples, trap assembly 320 may include a device for storing exhaust HCs and PMs, such as one or more bricks of a combination HC trap/PM filter, as illustrated with reference to the example embodiment 1200 of FIG. 12. The bricks may have monolith structures, such as the monolith structures of diesel particulate filters. The bricks may be made of, for example, an extruded HC trapping agent or adsorbent, such as activated carbon or catalyzed zeolite. The porosity of the brick substrate, that is the extruded HC adsorbent, may be adjusted to allow exhaust gas to flow through the walls. As illustrated in FIG. 12, the brick may include a plurality of channels 1202 inside for filtering particulate matter from exhaust gas 1206. Furthermore, alternate channels 1202 may be plugged, for example by plugs 1204. In one example, the plugs may force the exhaust gas 1206 to flow through channel walls 1208 and allow particulate matter 1210 from the cold start emissions to collect thereon. In still other examples, the particulate matter may collect on the outlet face of the channel plug, in which case, at the end of a storing operation, the outlet face of alternate channel plugs may be covered with particulate matter, giving rise to characteristic checkered patterns. Similarly, the flow of exhaust gas 1206 through the channel walls, made of the HC trapping agent, may enable exhaust HCs to be stored in the channel, such as in concentrated zones 1212.

While not shown, the trap assembly of FIGS. 5-6, and 12, may further include various sensors such as a pressure sensor, temperature sensor and/or exhaust gas sensor. In one example, a pressure sensor may be coupled to trap assembly 320, for example in the trap casing. An amount of HCs and PMs stored in the traps and filters of trap assembly 320 may then be inferred based on the estimated pressure. For example, when the pressure is below a threshold, a storing condition may be determined. Then, as storing proceeds, the pressure may rise and when the pressure is above the threshold, a purging condition may be determined. Similarly, as the purging operation proceeds, the pressure may drop and when the pressure is below the threshold a purging operation may be considered complete. In another example, the amount of HCs and PMs stored in the traps and filters of trap assembly 320 may be determined based on the reading of an exhaust gas sensor positioned downstream of the trap assembly, or near the trap assembly outlet.

Figure 7:
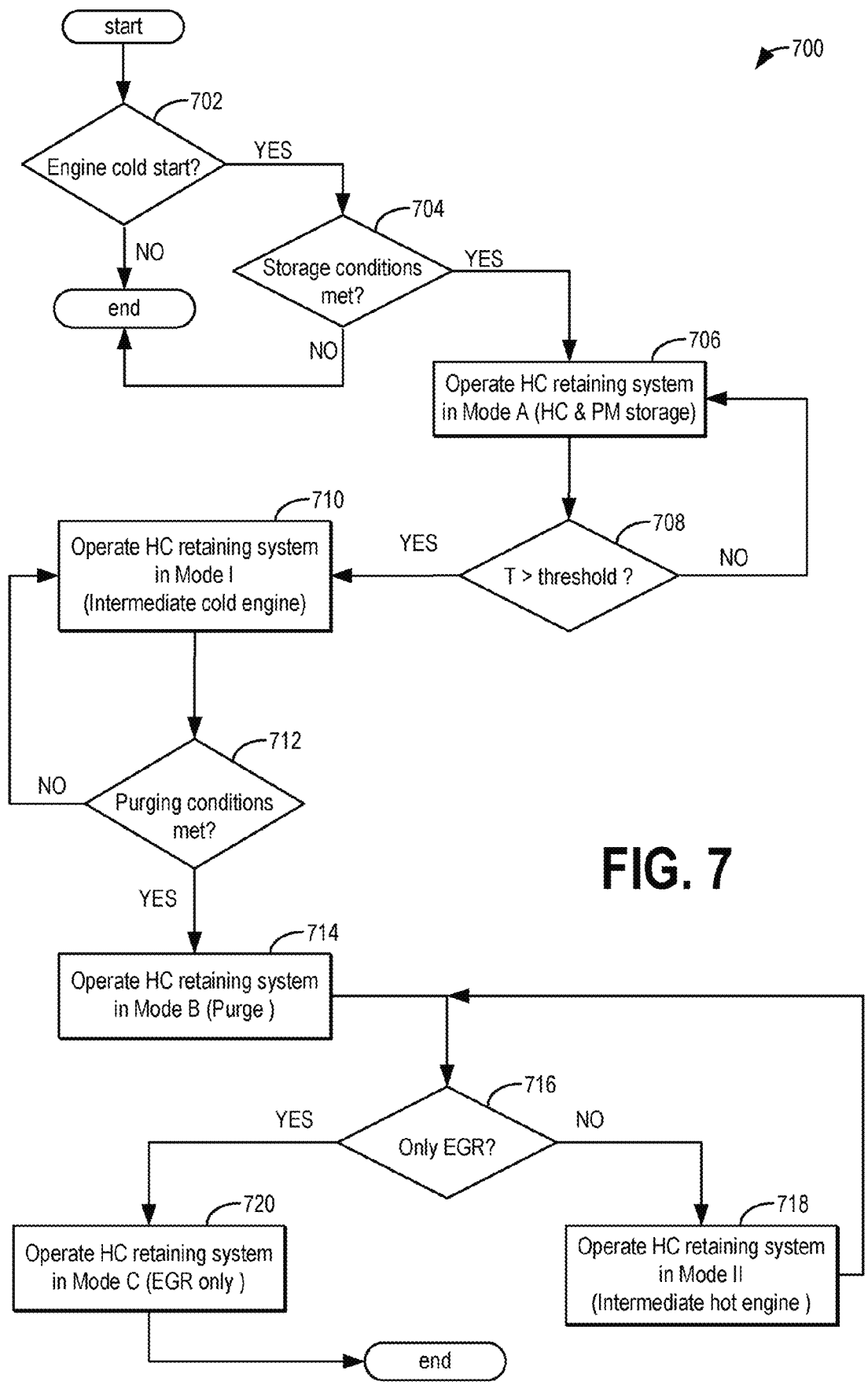
FIG. 7 shows a high level flow chart illustrating operation of the exhaust treatment system of FIG. 1.

Now turning to FIG. 7, an example routine 700 is shown for adjusting the operating mode of an exhaust treatment system, by adjusting the configuration of valves therein (as summarized in the table of FIG. 8). As such, the exhaust treatment system may be operated in one of 5 operating modes including a storage mode, a purging mode, an EGR mode, and two intermediate modes. Routine 700 may be implemented using systems, components, and devices described herein, but alternatively may be implemented using other suitable systems, components, and devices.

At 702, the routine confirms engine cold start conditions. For example, the routine may determine whether the engine is being started from rest and/or whether the engine has been started via an engine cranking operation. Further, the routine may estimate and/or infer an emission control device temperature and confirm that it is below a threshold temperature (such as, a catalyst light-off temperature). In one example, the emission control device temperature may be estimated using a dedicated temperature sensor, such as a temperature sensor mounted to the emission control device. In another example, the temperature may be inferred from one or more exhaust gas temperature sensors located in the exhaust passage 45 or exhaust manifold. In yet another example, the emission control device temperature may be inferred based on an engine off time (soak time), ambient temperature, engine coolant temperature, and intake air charge temperature. If cold start conditions are not confirmed, the routine may end. At 704, HC and PM storage conditions may be confirmed. In one example, storage conditions may be confirmed when the storage capacity of one or more traps and filters of exhaust treatment system 22 is greater than a threshold value. In another example, storage conditions may be confirmed upon determination that the exhaust treatment system 22 has been purged during a previous engine operation. Additionally, the routine may enable storage in exhaust treatment system 22 when the temperature of exhaust treatment system 22 is less than a maximum storage temperature. Further still, the routine may enable storage of exhaust HCs and PMs in exhaust treatment system 22 based on a fuel property of the fuel combusted in the engine, such as an alcohol amount in the fuel. If storage conditions are not confirmed, the routine may end.

If storage conditions are confirmed, at 706, the routine may adjust the plurality of valves of exhaust treatment system 22 to enable the system to operate in a first operating mode (Mode A, Exhaust HC and PM storage). Specifically, engine controller 12 may adjust first actuator 303, 403 to fully close exhaust throttle 302 while opening isolation valve 304, 404. Additionally, engine controller 12 may adjust second actuator 307, 407 to close purge valve 308, 408 while opening diverter valve 306, 406. Further still, controller 12 may close LP-EGR valve 39. In this configuration, exhaust gas may be vented to the atmosphere after flowing through trap assembly 320, wherein exhaust HCs and PMs may be retained.

At 708, it may be determined whether the emission control device temperature has reached a threshold. In one example, the threshold may correspond to an emission control device catalyst light-off temperature (that is, a temperature at which the catalyst may operate at high efficiency). If the threshold temperature has not been attained, the routine may return to 706 and continue operating in the first operating (storage) mode. In this way, untreated HC emissions may be retained in the trap assembly until activation of the catalytic converters, thereby improving the quality of cold-start emissions.

If the threshold temperature is confirmed (that is, the emission control device has reached a temperature where it is catalytically active), at 710, the routine may adjust the plurality of valves of exhaust treatment system 22 to enable the system to operate in a first intermediate operating mode (Mode I, Intermediate cold engine). Specifically, engine controller 12 may adjust first actuator 303, 403 to at least partially open exhaust throttle 302 while closing isolation valve 304, 404. Additionally, engine controller 12 may adjust second actuator 307, 407 to open purge valve 308, 408 while closing diverter valve 306, 406. Further still, controller 12 may maintain LP-EGR valve 39 in the closed state. In this configuration, exhaust gas may be vented to the atmosphere following catalytic treatment through the (now catalytically active) emission control device. Herein, trap assembly 320 may be isolated from the exhaust flow, allowing the treated exhaust to flow unobstructed through the exhaust passage and out of tailpipe 35 to the atmosphere. In this way, cleaned exhaust may be vented to the atmosphere while the engine warms up and/or until purging condition are confirmed.

At 712, it may be determined whether purging conditions have been met. As such, purging may be enabled based on various engine and vehicle operating parameters, including the amount of HCs and PMs stored in the exhaust treatment system 22 (such as the amount of HCs stored in the HC traps and/or the amount of PMs stored in the filters of trap assembly 320 being greater than a threshold), the temperature and/or pressure of exhaust treatment system (such as, the temperature and pressure being above a threshold), fuel temperature, engine temperature, the number of starts since the last purge (such as the number of starts being greater than a threshold), fuel properties (such as the alcohol amount in the combusted fuel, the frequency of purging increased as an alcohol amount in the fuel increases), and various others. In one example, the amount of HCs and PMs stored in the traps and filters of trap assembly 320 may be determined based on an increase in pressure of trap assembly 320 (for example, as determined by a dedicated pressure sensor). In another example, the amount of HCs and PMs stored in the traps and filters of trap assembly 320 may be determined based on the reading of an exhaust gas sensor positioned downstream of the trap assembly. In one example, purging conditions may be considered met if the routine determines that exhaust gases were previously routed to the exhaust treatment system 22 during the current engine start. In another example, purging conditions may be considered met if the engine temperature has increased to meet EGR stability thresholds (that is, a threshold temperature above which EGR may be effective). If purging conditions are not met, while the temperature of the emission control device remains above the threshold temperature, the routine may continue operating in the first intermediate operating mode.

If purging conditions are confirmed, at 714, the routine may adjust the plurality of valves of exhaust treatment system 22 to enable the system to operate in a second operating mode (Mode B, Trap assembly purging). Specifically, engine controller 12 may adjust first actuator 303, 403 to maintain exhaust throttle 302 at least partially open while maintaining isolation valve 304, 404 closed. Additionally, engine controller 12 may adjust second actuator 307, 407 to maintain purge valve 308, 408 open and diverter valve 306, 406 closed. Further still, controller 12 may open LP-EGR valve 39. In this configuration, exhaust gas may be routed through purge conduit 312, 412 into trap assembly 320 in a direction of flow opposite to the direction of flow during the first (storage) mode of operation. Specifically, heated exhaust may flow from the outlet of trap assembly 320 towards the inlet of trap assembly 320 before being recirculated into the engine intake via the LP-EGR passage. In this way, the purge flow may also be used as an EGR flow, thereby providing fuel economy benefits. By sharing components between the exhaust treatment system and the EGR system, component reduction benefits may also be achieved.

While the depicted routine illustrates transitioning from the first operating mode to the second operating mode by operating in the first intermediate mode, in alternate examples, the routine may transition from the first operating mode to the second operating mode without passing through an intermediate mode.

Following completion of the purging operation, at 716, it may be determined whether only EGR is desired. In one example, the purging operation may be considered complete when the amount of HCs stored in the HC traps and/or the amount of PMs stored in the filters of trap assembly 320 are lower than a threshold. In another example, the purging operation may be considered complete after a predetermined duration since the start of the purging operation.

In one example, when no EGR is desired at 716, and the engine is at idle speeds and/or the exhaust temperature is above a threshold (for example, above 400° C.), at 718, the routine may adjust the plurality of valves of exhaust treatment system 22 to enable the system to operate in a second intermediate operating mode (Mode II, Intermediate idle engine operation). Specifically, engine controller 12 may adjust first actuator 303, 403 to maintain exhaust throttle 302 at least partially open while maintaining isolation valve 304, 404 closed. Additionally, engine controller 12 may adjust second actuator 307, 407 to maintain purge valve 308, 408 open and diverter valve 306, 406 closed. Further still, controller 12 may close LP-EGR valve 39. In this configuration, hot exhaust gas may be vented to the atmosphere following catalytic treatment through the emission control device while trap assembly 320 is isolated from the potentially detrimental effects of the heated exhaust flow.

In comparison, if only EGR is desired at 716, for example following a successful purging operation, at 720, the routine may adjust the plurality of valves of exhaust treatment system 22 to enable the system to operate in a third operating mode (Mode C, EGR only). Specifically, engine controller 12 may adjust first actuator 303, 403 to maintain exhaust throttle 302 at least partially open while maintaining isolation valve 304, 404 closed. Additionally, engine controller 12 may adjust second actuator 307, 407 to close purge valve 308, 408 and open diverter valve 306, 406. Further still, controller 12 may maintain LP-EGR valve 39 open. In this configuration, exhaust gas may be recirculated into the engine intake via conduit 373, 473 and LP-EGR passage 73. Further, trap assembly 320 may remain isolated from the EGR flow, thereby enabling an EGR operation to be performed independent of the exhaust treatment system.

While the depicted routine illustrates transitioning from the second operating mode to the third operating mode by operating in the second intermediate mode, in alternate examples, the routine may transition from the second operating mode to the third operating mode without passing through an intermediate mode.

In this way, by coupling an exhaust treatment system with an EGR system, a purge flow of stored HCs and PMs may be used as an EGR flow, when a purging operation is desired, and an EGR flow independent of the purge flow may be achieved when only an EGR operation is desired. By synergizing the exhaust treatment system and the EGR system, the number of components in the vehicle system may also be reduced.

Now turning to FIG. 9, plot 900 depicts the hydrocarbon adsorption efficiency of exhaust treatment system 22 with reference to a variety of different hydrocarbon species. Specifically, the plot compares the amount (in milligrams) of each of the various HC species (specifically, different non-methane HC species, NMHC) at the inlet of the trap assembly with an amount at the outlet (for example, as determined using gas chromatography and fourier transform infrared spectroscopy), thereby determining an adsorption efficiency for each trapped HC species. In one example, as depicted, the tested trap assembly may have a base substrate canister with a diameter of 3 inches and a length of 8 inches, and may be impregnated with adsorbent at 200 cpsi/0.88 L. The fuel tested therein may be an ethanol blend, for example as depicted herein, E85 (which has a composition of 85% ethanol and 15% gasoline). As such, in flex-fuel vehicles that operate on fuel having a varying alcohol composition (e.g., ranging from gasoline (E0) to ethanol (E85)), the alcohol blended fuels may produce exhaust with widely varying compositions. For example, the exhaust from alcohol blended fuels with larger alcohol content may have a larger percentage of non-methane organic gases (NMOGs, herein also referred to as NMHCs), including smaller chain hydrocarbons. As such, the varying composition of the exhaust may result in a wide variation in adsorption efficiencies on commonly used traps. As shown in plot 900, by using a combination of trap materials and particulate filters, as described in the example exhaust treatment system of the present disclosure, the adsorption efficiency of the various exhaust HC species may be substantially improved. In one example, as depicted, 80% of the emitted ethanol species may be adsorbed while 60% of C3-hydrocarbons may be adsorbed. In another example, 93-99% of C4-C9 hydrocarbons may be adsorbed. As such, the overall adsorption efficiency of exhaust HC species may be substantially improved (for example, increased to 72%). Thus, the trap may be able to remove a wider range of HC and PM constituents from exhaust emissions. By using such traps, the efficiency of the exhaust treatment system may be improved.

FIG. 10 shows a plot 1000 depicting the effect of monolith aging on the HC adsorption efficiency of the trap(s) of exhaust treatment system 22. Specifically, the monolith durability of the traps/filters is tested by studying the effect on HC adsorption efficiency upon aging the monolith for 0-300 hours at a range of exhaust temperatures (for example, from 250° C. to 350° C.), and at a range of air-fuel ratios (for example, from lambda 1.0 to 1.3). As shown, even when treated for long hours with rich exhaust at substantially high temperatures (for example, as shown by the plot for 350 C lam 1.3), the HC adsorption efficiency of the aged trap monolith may not be substantially degraded. For example, the aged monolith may have HC adsorption efficiencies in the range of 50-90% adsorption, in comparison to the HC adsorption efficiency of a fresh trap monolith which may be, for example, 92%. Thus, the trap may be able to remove emission HCs and PMs with improved efficiency for a longer period of time. In this way, the operative life of the exhaust treatment system may be extended.

FIG. 11 shows a table 1100 depicting the stored hydrocarbon removal efficiency of exhaust treatment system 22. Specifically, the table compares the amount (in percentage) of stored HCs that are released from the trap when purged with exhaust gas of differing temperatures (as indicated at inlet gas temperature) and flow rates (as indicated at average on-cycle flow through CHCT). As shown, even when purged with exhaust gas of lower temperatures (for example, in the range of 200° C. to 250° C.), at higher flow rates (for example, at 53 L/min), a substantial amount of the stored HCs (for example, 80% of stored HCs) may be effectively desorbed. When purged with exhaust gas at higher temperatures (for example, in the range of 300° C. to 350° C.), and high flow rates (for example, at 53 L/min), substantially all of the stored HCs (for example, 95% of stored HCs) may be effectively desorbed.

Thus, the traps and filters of the exhaust treatment system may be able to effectively adsorb a variety of HC species and also effectively desorb (or remove) the stored HCs at moderate purging gas temperatures and flow rates. In this way, the exhaust treatment system may substantially improve the quality of exhaust emissions.

In this way, an exhaust treatment system coupled to a low pressure EGR system may be advantageously used to combine a purge flow with an EGR flow when purging of stored HCs and PMs is desired, while enabling only an EGR flow when only EGR is desired. By adjusting the opening and closing of a diverter valve and purge valve, a direction of exhaust flow through an exhaust after-treatment system may be selectively varied thereby varying operating modes between storing operations, purging operations, and EGR operations. By sharing components between the exhaust treatment system and the EGR system, the cost and complexity of the exhaust treatment system may be reduced while improving its performance.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The invention claimed is:

1. A method for operating an engine including an exhaust HC trap/PM filter, comprising:
   a first mode routing exhaust through the HC trap/PM filter to an exhaust tailpipe;
   a second mode routing exhaust through the HC trap/PM filter to an engine intake via a low-pressure exhaust gas recirculation (EGR) system; and
   a third mode routing exhaust to the engine intake through the low-pressure EGR system while bypassing and isolating the HC trap/PM filter from exhaust.

2. The method of claim 1, wherein a transition between the modes is based on at least one of an exhaust gas temperature and an emission control device temperature.

3. The method of claim 1, wherein the first mode includes storing exhaust hydrocarbons (HCs) and particulate matter (PM) in the HC trap/PM filter, and wherein the second mode includes purging the stored HCs and PMs to the engine intake, and further wherein the third mode includes recirculating exhaust to the engine intake.

4. The method of claim 3, wherein the HC trap/PM filter includes a trap assembly comprising at least one device configured to trap HCs and PMs.

5. The method of claim 4, wherein the trap assembly comprises a plurality of HC traps of differing porosity and a plurality of PM filters of differing porosity.

6. The method of claim 5, wherein the plurality of HC traps includes at least one of activated carbon and catalyzed zeolite, and wherein the plurality of PM filters includes at least one of a diesel particulate filter, activated carbon, catalyzed zeolite, natural fiber, composite fiber, and foam.

7. The method of claim 1, wherein the HC trap/PM filter includes an exhaust throttle, an isolation valve, a diverter valve, and a purge valve, and wherein the low pressure EGR system includes an EGR valve, and further wherein, the first mode includes closing the exhaust throttle, opening the isolation valve, closing the purge valve, opening the diverter valve, and closing the EGR valve, wherein the second mode includes opening the exhaust throttle, closing the isolation valve, opening the purge valve, closing the diverter valve, and opening the EGR valve, and wherein the third mode includes opening the exhaust throttle, closing the isolation valve, closing the purge valve, opening the diverter valve, and opening the EGR valve.

8. The method of claim 7, wherein the opening of the exhaust throttle is coupled to the closing of the isolation valve, and wherein the opening of the diverter valve is coupled to the closing of the purge valve.

9. The method of claim 7, wherein the HC trap/PM filter further includes a trap assembly, the method further comprising, transitioning from the first mode to the second mode by a first intermediate mode, and transitioning from the second mode to the third mode by a second intermediate mode, the first and second intermediate modes including routing exhaust through the HC trap/PM filter to the exhaust tailpipe while bypassing the trap assembly.

10. The method of claim 9 wherein the first and second intermediate modes include opening the exhaust throttle, closing the isolation valve, opening the purge valve, closing the diverter valve, and closing the EGR valve.

11. A method for operating an engine including an exhaust treatment system coupled to an engine exhaust, the exhaust treatment system further coupled to an engine intake via an exhaust gas recirculation (EGR) system, the method comprising:
   during an engine cold start condition, routing exhaust gas through the exhaust treatment system to an exhaust tailpipe to store hydrocarbons and particulate matter in the exhaust treatment system;
   during a purging condition, routing exhaust gas through the exhaust treatment system to an engine intake via the EGR system to purge the stored HCs and PMs hydrocarbons;
   during an EGR condition, routing exhaust gas to an engine intake through the EGR system while bypassing the exhaust treatment system to perform exhaust gas recirculation only, wherein the exhaust treatment system includes a trap assembly comprising one or more HC traps for storing exhaust HCs and one or more PM filters for storing exhaust PMs, the one or more HC traps including one or more HC traps of differing porosity, the one or more PM filters including one or more PM filters of differing porosity, the method further comprising:

during a first intermediate condition following the engine cold start condition and preceding the purging condition, routing exhaust gas through the exhaust treatment system to the exhaust tailpipe while bypassing the trap assembly; and during a second intermediate condition following the purging condition and preceding the EGR condition, routing exhaust gas through the exhaust treatment system to the exhaust tailpipe while bypassing the trap assembly.

12. The method of claim 11, wherein the exhaust treatment system further includes an exhaust throttle valve, an isolation valve, a diverter valve, and a purge valve, and wherein the EGR system includes an EGR valve, and further wherein, during the engine cold start condition, routing exhaust gas includes closing the exhaust throttle valve, opening the isolation valve, closing the purge valve, opening the diverter valve, and closing the EGR valve, wherein during the purging condition, routing exhaust gas includes opening the exhaust throttle valve, closing the isolation valve, opening the purge valve, closing the diverter valve, and opening the EGR valve, and wherein during the EGR condition, routing exhaust gas includes opening the exhaust throttle valve, closing the isolation valve, closing the purge valve, opening the diverter valve, and opening the EGR valve.

13. A system for a vehicle including an engine having an intake and an exhaust, the system comprising:
- an EGR system, coupled to the engine intake and exhaust, the EGR system configured to recirculate at least a portion of exhaust gas from the engine exhaust to the engine intake;
- an exhaust treatment system coupled to the engine exhaust, said exhaust treatment system further coupled to the engine intake via the EGR system, the exhaust treatment system including a trap assembly, said trap assembly including a device for storing exhaust HCs and exhaust PMs; and
- a control system with a computer readable storage medium with instructions for,
  during a first storage condition, operating the engine in a first mode with exhaust gas flowing through the exhaust treatment system, in a first direction, and out of an exhaust tailpipe while bypassing the EGR system;
  during a second purging condition, operating the engine in a second mode with exhaust gas flowing through the exhaust treatment system, in a second, opposite, direction, and into the engine intake via the EGR system; and
  during a third EGR condition, operating the engine in a third mode with exhaust gas flowing through the EGR system into the engine intake while bypassing the exhaust treatment system, wherein the exhaust treatment system further includes an exhaust throttle valve, an isolation valve, a diverter valve, and a purge valve, and wherein the EGR system includes an EGR valve, and further wherein, operating in the first mode includes closing the exhaust throttle valve, opening the isolation valve, closing the purge valve, opening the diverter valve, and closing the EGR valve, wherein operating in the second mode includes opening the exhaust throttle valve, closing the isolation valve, opening the purge valve, closing the diverter valve, and opening the EGR valve, and wherein operating in the third mode includes opening the exhaust throttle valve, closing the isolation valve, closing the purge valve, opening the diverter valve, and opening the EGR valve.

14. The system of claim 13, wherein the control system further includes instructions for,
  during a first intermediate condition, transitioning from the first operating mode to the second operating mode by operating in the first intermediate mode with exhaust gas flowing through the exhaust treatment system to the exhaust tailpipe while bypassing the trap assembly; and
  during a second intermediate condition, transitioning from the second operating mode to the third operating mode by operating in a second intermediate mode with exhaust gas flowing through the exhaust treatment system to the exhaust tailpipe while bypassing the trap assembly,
  wherein operating in the first and second intermediate modes includes opening the exhaust throttle valve, closing the isolation valve, opening the purge valve, closing the diverter valve, and closing the EGR valve.

15. The system of claim 13, wherein the trap assembly includes one or more HC traps of differing porosity, and one or more PM filters of differing porosity.

16. The system of claim 13, wherein the EGR system is a low pressure EGR system.

17. The system of claim 13, wherein during the second purging condition, a duty cycle of the purge valve is adjusted based on one of a desired EGR flow rate and a desired trap assembly inlet temperature.

18. A system for a vehicle comprising:
- a spark-ignited turbocharged engine having an intake and an exhaust;
- a gasoline, direct injection, fuel system coupled to the engine;
- a particulate filter and a hydrocarbon trap, selectively coupled to at least the exhaust and the intake via a low-pressure exhaust gas recirculation (EGR) system coupled to the exhaust downstream of the particulate filter and the hydrocarbon trap; and
- a control system having a computer non-transitory readable storage medium with instructions encoded thereon, the instructions including:
  instructions for operating in a first mode including routing exhaust gas through the particulate filter and the hydrocarbon trap to an exhaust tailpipe;
  instructions for operating in a second mode including routing exhaust gas through the particulate filter and the hydrocarbon trap to the engine intake via the low-pressure EGR system; and
  instructions for operating in a third mode including routing exhaust gas to the engine intake via the low-pressure EGR system while bypassing the particulate filter and the hydrocarbon trap.

19. The system of claim 18, wherein the hydrocarbon trap comprises a cooler coated with a hydrocarbon adsorbent.

* * * * *